United States Patent
Arai et al.

(10) Patent No.: US 11,408,963 B2
(45) Date of Patent: Aug. 9, 2022

(54) WAVE-SOURCE-DIRECTION ESTIMATION DEVICE, WAVE-SOURCE-DIRECTION ESTIMATION METHOD, AND PROGRAM STORAGE MEDIUM

(71) Applicant: NEC Corporation, Tokyo (JP)

(72) Inventors: Yumi Arai, Tokyo (JP); Reishi Kondo, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 17/252,405

(22) PCT Filed: Jun. 25, 2018

(86) PCT No.: PCT/JP2018/023971
§ 371 (c)(1),
(2) Date: Dec. 15, 2020

(87) PCT Pub. No.: WO2020/003343
PCT Pub. Date: Jan. 2, 2020

(65) Prior Publication Data
US 2021/0263126 A1    Aug. 26, 2021

(51) Int. Cl.
*G01S 3/808* (2006.01)
*G10L 25/06* (2013.01)
(Continued)

(52) U.S. Cl.
CPC .............. *G01S 3/808* (2013.01); *G10L 25/06* (2013.01); *G10L 25/18* (2013.01); *H04R 1/406* (2013.01); *H04R 3/005* (2013.01)

(58) Field of Classification Search
CPC ........ G01S 3/808; G01S 3/801; G01S 3/8083; G01S 3/805; G01S 3/86; G10L 25/06;
(Continued)

(56) References Cited

U.S. PATENT DOCUMENTS

| | | | | |
|---|---|---|---|---|
| 2008/0089531 A1* | 4/2008 | Koga | ................. | H04R 3/005 704/E21.012 |
| 2015/0245152 A1* | 8/2015 | Ding | ................. | H04R 1/406 381/56 |

(Continued)

FOREIGN PATENT DOCUMENTS

| | | |
|---|---|---|
| JP | 2008-089312 A | 4/2008 |
| JP | 2008089312 A * | 4/2008 |

(Continued)

OTHER PUBLICATIONS

International Search Report for PCT Application No. PCT/JP2018/023971, dated Sep. 11, 2018.

(Continued)

*Primary Examiner* — Yogeshkumar Patel
(74) *Attorney, Agent, or Firm* — Sughrue Mion, PLLC

(57) ABSTRACT

A wave-source-direction estimation device includes: a plurality of input units that acquires, as input signals, electrical signals based on waves detected by a plurality of sensors; a signal selection unit that selects a plurality of pairs that are each a combination of two input signals from among a plurality of the input signals; a relative delay time calculation unit that calculates, as relative delay times, arrival time differences of the waves at the sensors that are supply sources of the two input signals composing each of the pairs, for each wave source direction; and an integrated-estimated-direction-information calculation unit that generates per-frequency estimated direction information for each of the pairs using the input signals composing each of the pairs and the relative delay times of each of the pairs and generates integrated estimated direction information by assigning a weight to and integrating the estimated direction information on all the pairs.

15 Claims, 16 Drawing Sheets

(51) Int. Cl.
*G10L 25/18* (2013.01)
*H04R 1/40* (2006.01)
*H04R 3/00* (2006.01)

(58) Field of Classification Search
CPC ......... G10L 25/18; H04R 1/406; H04R 3/005; H04R 2430/21; H04R 2430/20; H04R 2430/23; G01H 3/00
See application file for complete search history.

(56) References Cited

U.S. PATENT DOCUMENTS

| | | | | |
|---|---|---|---|---|
| 2016/0171965 A1* | 6/2016 | Arai | ........................ | H04R 29/00 381/56 |
| 2019/0146054 A1* | 5/2019 | Kato | ........................ | G01S 3/86 367/125 |
| 2019/0250240 A1* | 8/2019 | Kato | ........................ | G01S 3/801 |

FOREIGN PATENT DOCUMENTS

| JP | 2010-175431 A | | 8/2010 |
|---|---|---|---|
| JP | 2010175431 A | * | 8/2010 |
| JP | 2010-193323 A | | 9/2010 |
| JP | 2010193323 A | * | 9/2010 |
| JP | 2011-071686 A | | 4/2011 |
| JP | 2011071686 A | * | 4/2011 |
| JP | 2015-161551 A | | 9/2015 |
| WO | 2018/003158 A1 | | 1/2018 |

OTHER PUBLICATIONS

English translation of Written opinion for PCT Application No. PCT/JP2018/023971, dated Sep. 11, 2018.
Masanori Kato et al., "TDOA Estimation Based on Phase-Voting Cross Correlation and Circular Standard Deviation", Institute of Electronics, Information and Communication Engineers (IEICE) Technical Report, Mar. 2017, vol. 116, No. 477 pp. 159-164, ISSN: 0913-5685, Japan.
Masanori Kato et al., "TDOA Estimation Based on Phase-Voting Cross Correlation and Circular Standard Deviation", 2017 25th European Signal Processing Conference (EUSIPCO), 2017, pp. 1230-1234, ISBN: 978-0-9928626-7-1, doi: 10.23919/EUSIPCO.2017.8081404, USA.

* cited by examiner

WAVE-SOURCE-DIRECTION ESTIMATION DEVICE, WAVE-SOURCE-DIRECTION ESTIMATION METHOD, AND PROGRAM STORAGE MEDIUM

This application is a National Stage Entry of PCT/JP2018/023971 filed on Jun. 25, 2018, the contents of all of which are incorporated herein by reference, in their entirety.

TECHNICAL FIELD

The present invention relates to a wave-source-direction estimation device, a wave-source-direction estimation method, and a program. In particular, the present invention relates to a wave-source-direction estimation device, a wave-source-direction estimation method, and a program that estimate a wave source direction using signals based on waves detected by a plurality of sensors.

BACKGROUND ART

PTL 1 and NPL 1 disclose a method of estimating the direction of a sound source from the arrival time difference between sound receiving signals of two microphones. In the methods disclosed in PTL 1 and NPL 1, the sound source direction is estimated in such a way that the probability density function of the arrival time difference between sound waves is worked out for each frequency, and the arrival time difference is calculated from a probability density function obtained by superposing the probability density functions.

PTL 2 discloses a sound source direction estimation device using a phase difference distribution. The device disclosed in PTL 2 acquires acoustic signals on a plurality of channels from a plurality of microphones, and calculates phase differences between these signals for each of frequency bins defined in advance to generate a phase difference distribution. The device disclosed in PTL 2 calculates a score for each direction according to the similarity between a template generated in advance for each direction and the phase difference distribution, and estimates the direction of the sound source based on the calculated score.

CITATION LIST

Patent Literature

[PTL 1] WO 2018/003158 A
[PTL 2] JP 2015-161551 A

Non Patent Literature

[NPL 1] M. Kato, Y. Senda, R. Kondo, "TDOA Estimation Based on Phase-Voting Cross Correlation and Circular Standard Deviation", 25th European Signal Processing Conference (EUSIPCO), EURASIP, August 2017, pp. 1230-1234

SUMMARY OF INVENTION

Technical Problem

In the methods of PTL 1 and NPL 1, in a frequency band where the signal-to-noise ratio (SNR) is high, the probability density function of the arrival time difference forms a sharp peak. Therefore, according to the methods of PTL 1 and NPL 1, the arrival time difference can be accurately estimated even when the high SNR band is small. However, in the methods of PTL 1 and NPL 1, when the probability density functions of arrival time differences per frequency are superposed, a peak is generated in the superposed probability density functions because of the coincidental match between phases, even if no sound source exists. For this reason, the methods disclosed in PTL 1 and NPL 1 have a disadvantage in that a virtual-image sound source is erroneously estimated.

According to the device of PTL 2, the sound source direction can be estimated using the phase difference distribution with a smaller calculation amount. In the device of PTL 2, the phase difference distribution between two microphones is compared with a template generated in advance for each direction, and a direction with a higher similarity is estimated as the direction of the sound source. However, the device of PTL 2 has a disadvantage in that a virtual-image sound source is erroneously estimated when the phase difference distribution coincidentally resembles the template, even if no sound source exists.

It is an object of the present invention to provide a wave-source-direction estimation device capable of reducing erroneous estimation of a virtual-image wave source and highly accurately estimating the direction of a wave source by solving the above problems.

Solution to Problem

A wave-source-direction estimation device according to one aspect of the present invention includes: a plurality of input units that acquires, as input signals, electrical signals based on waves detected by a plurality of sensors; a signal selection unit that selects a plurality of pairs that are each a combination of two input signals from among a plurality of the input signals; a relative delay time calculation unit that calculates, as relative delay times, arrival time differences of the waves at the sensors that are supply sources of the two input signals composing each of the pairs, for each wave source direction; and an integrated-estimated-direction-information calculation unit that generates per-frequency estimated direction information for each of the pairs using the input signals composing each of the pairs and the relative delay times of each of the pairs, calculates contribution rates per frequency with respect to estimated direction information generated for each wave source direction using the per-frequency estimated direction information generated for each of the pairs, calculates, based on the calculated contribution rates, a weight for each wave source direction according to a similarity of the contribution rates between different pairs among the pairs, and generates integrated estimated direction information by assigning the weight to and integrating the estimated direction information on all the pairs.

A wave-source-direction estimation method according to one aspect of the present invention is implemented by an information processing device, and the wave-source-direction estimation method includes: acquiring, as input signals, electrical signals based on waves detected by a plurality of sensors; selecting a plurality of pairs that are each a combination of two input signals from among a plurality of the input signals; calculating, as relative delay times, arrival time differences of the waves at the sensors that are supply sources of the two input signals composing each of the pairs, for each wave source direction; generating per-frequency estimated direction information for each of the pairs using the input signals composing each of the pairs and the relative delay times of each of the pairs; calculating contribution rates per frequency with respect to estimated direction information generated for each wave source direction using the per-frequency estimated direction information generated for each of the pairs; calculating, based on the calculated contribution rates, a weight for each wave source direction according to a similarity of the contribution rates between different pairs among the pairs; and generating integrated estimated direction information by assigning the weight to and integrating the estimated direction information on all the pairs.

A program according to one aspect of the present invention causes a computer to execute: a process of acquiring, as input signals, electrical signals based on waves detected by a plurality of sensors; a process of selecting a plurality of pairs that are each a combination of two input signals from among a plurality of the input signals; a process of calculating, as relative delay times, arrival time differences of the waves at the sensors that are supply sources of the two input signals composing each of the pairs, for each wave source direction; a process of generating per-frequency estimated direction information for each of the pairs using the input signals composing each of the pairs and the relative delay times of each of the pairs; a process of calculating contribution rates per frequency with respect to estimated direction information generated for each wave source direction using the per-frequency estimated direction information generated for each of the pairs; a process of calculating, based on the calculated contribution rates, a weight for each wave source direction according to a similarity of the contribution rates between different pairs among the pairs; and a process of generating integrated estimated direction information by assigning the weight to and integrating the estimated direction information on all the pairs.

Advantageous Effects of Invention

According to the present invention, it is possible to provide a wave-source-direction estimation device capable of reducing erroneous estimation of a virtual-image wave source and highly accurately estimating the direction of a wave source.

EXAMPLE EMBODIMENT

Figure 1:
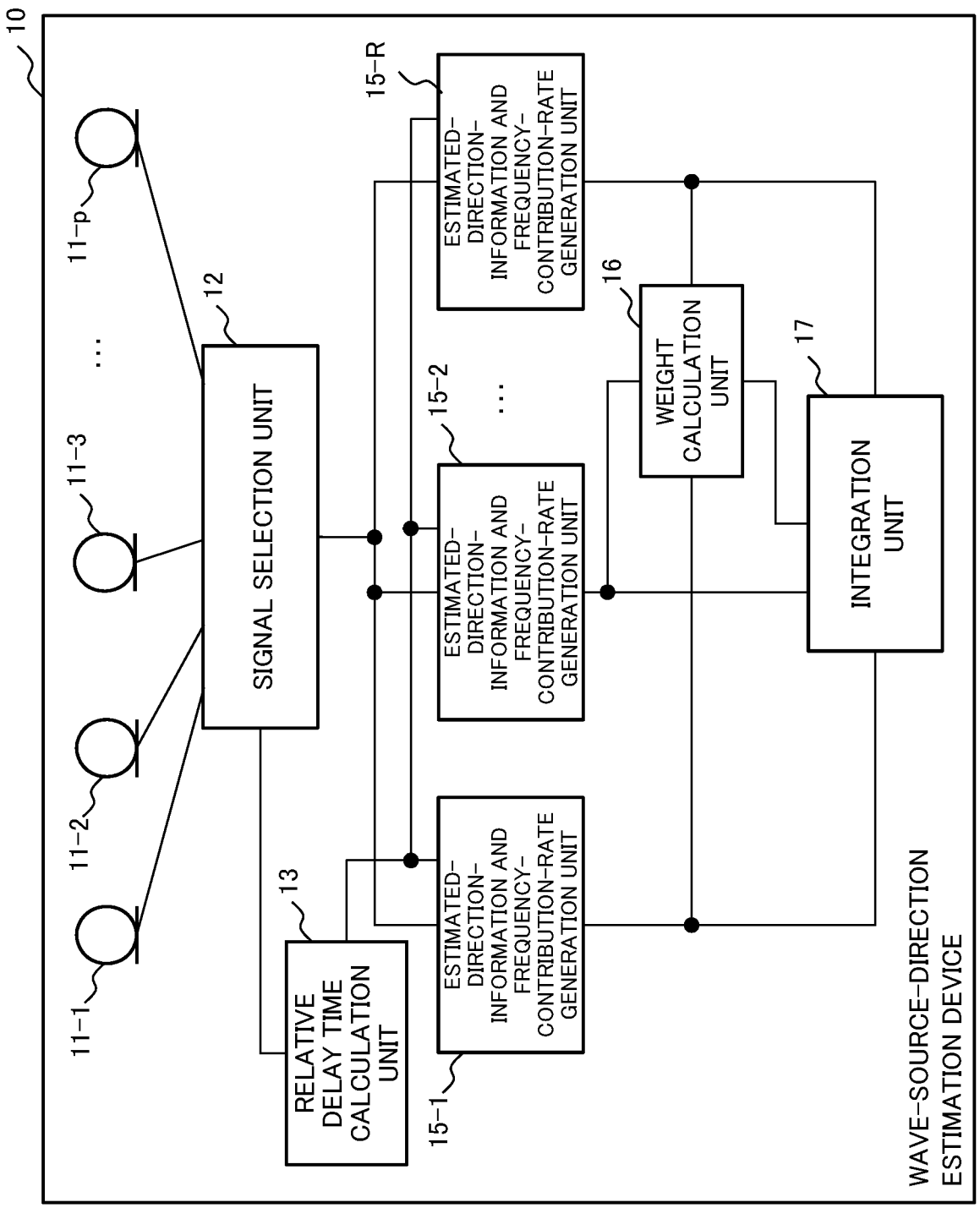
FIG. 1 is a block diagram illustrating an example of the configuration of a wave-source-direction estimation device according to a first example embodiment of the present invention.

Modes for carrying out the present invention will be described below with reference to the accompanying drawings. However, while the example embodiments described below are limited to technologically preferred ones for carrying out the present invention, the scope of the invention is not limited to the following. In all the figures used in the following explanation of the example embodiments, the same reference signs are given to similar portions unless there is a particular reason. In the following example embodiments, a repetitive description of similar configuration and operation is omitted in some cases. The directions of the arrows in the drawings indicate examples and do not limit the directions of the signals between the blocks.

First Example Embodiment

First, a wave-source-direction estimation device according to a first example embodiment of the present invention will be described with reference to the drawings. In the following, an example will be described in which the wave-source-direction estimation device of the present example embodiment estimates the direction of a generation source (also referred to as wave source) of a sound wave, which is a vibration wave of air or water. Therefore, the wave-source-direction estimation device of the present example embodiment puts, as a target for estimation, the direction of a wave source of a sound wave that has been converted into an electrical signal by a microphone (hereinafter also referred to as mic). The estimation target of the wave-source-direction estimation device of the present example embodiment is not limited to the direction of the wave source of the sound wave, but the wave-source-direction estimation device can be used to estimate the direction of the wave source of any wave such as a vibration wave or an electromagnetic wave.

(Configuration)

FIG. 1 is a block diagram illustrating the configuration of a wave-source-direction estimation device 10 of the present example embodiment. The wave-source-direction estimation device 10 includes a plurality of input terminals 11, a signal selection unit 12, a relative delay time calculation unit 13, a plurality of estimated-direction-information and frequency-contribution-rate generation units 15, a weight calculation unit 16, and an integration unit 17.

The wave-source-direction estimation device 10 includes p input terminals 11 (p is an integer equal to or more than 2). The wave-source-direction estimation device 10 includes R estimated-direction-information and frequency-contribution-rate generation units 15 (R is an integer equal to or more than 1). In FIG. 1, in order to distinguish between the individual input terminals 11, numbers of 1 to p are each given to the end of the reference sign with a hyphen interposed therebetween. Similarly, in FIG. 1, in order to distinguish between the individual estimated-direction-information and frequency-contribution-rate generation units 15, numbers of 1 to R are each given to the end of the reference sign with a hyphen interposed therebetween. The numbers given to the estimated-direction-information and frequency-contribution-rate generation units 15 represent the numbers given to pairs of microphones (hereinafter also referred to as microphone pair) used for estimating the wave source direction.

[Input Terminal]

Each of the plurality of input terminals 11-1 to 11-$p$ (also referred to as input units) is connected to a microphone (not illustrated). Electrical signals that have been converted from sound waves (also referred to as sound signals) collected by a plurality of microphones arranged at different positions are input as input signals to each of the plurality of input terminals 11-1 to 11-$p$. In the following, the input signal input to the m-th input terminal 11-$m$ at a time point t is denoted as $x_m(t)$ (t: a real number, m: an integer equal to or more than 1 but equal to or less than p).

The microphone is a sound collecting device that collects sound waves in which sounds generated by a desired sound source are blended with various noises generated around the microphone. The microphone converts the collected sound waves into digital signals (also referred to as sample value series). The plurality of microphones is arranged at different positions to collect sound waves from the desired sound source. The plurality of microphones is one-to-one connected to the input terminals 11-1 to 11-$p$. In the following, it is assumed that an input signal that has been converted from a sound wave collected by an m-th microphone is supplied to the m-th input terminal 11-$m$. The input signal supplied to the m-th input terminal 11-$m$ is also referred to as "m-th microphone input signal".

[Signal Selection Unit]

The signal selection unit 12 selects two input signals from among p input signals supplied to the input terminals 11-1 to 11-$p$. The signal selection unit 12 outputs the two selected input signals to one of the estimated-direction-information and frequency-contribution-rate generation units 15-1 to 15-R, and outputs position information (hereinafter also referred to as microphone position information) on the microphones that are the supply sources of the input signals, to the relative delay time calculation unit 13.

The number R of the estimated-direction-information and frequency-contribution-rate generation units 15 corresponds to the number R of combinations of input signals. The signal selection unit 12 may select all combinations or some combinations when selecting two input signals. When all combinations are selected, R is represented by following formula 1.

$$R = C(p, 2) = \frac{p!}{2!(p-2)!} \quad (1)$$

The wave-source-direction estimation device 10 estimates the direction of a sound source, using the time difference produced when sound waves from the desired sound source arrive at two microphones (also referred to as microphone pair). If the interval between two microphones (hereinafter also referred to as microphone interval) is too large, the direction estimation accuracy is lowered because the sound from the desired sound source is not observed as the single sound due to the influence of a medium such as air or water. If the microphone interval is too small, the direction estimation accuracy is also lowered because the arrival time difference of the sound waves at two microphones becomes too small. Therefore, the signal selection unit 12 preferably combines and selects input signals of a microphone pair of which a microphone interval d falls within a fixed range as indicated by formula 2 ($d_{min}$, $d_{max}$: real numbers).

$$d_{min} \leq d \leq d_{max} \quad (2)$$

For example, when the microphone interval d is sufficiently small, the signal selection unit 12 selects two input signals having the maximum microphone interval d. For example, when the microphone interval d is sufficiently small, the signal selection unit 12 sorts the microphone intervals d in order from the larger microphone interval, and selects a combination of input signals having larger microphone intervals up to the R-th place (r<C(p, 2)). In this manner, by selecting some combinations of input signals from the plurality of microphones, it is possible to prevent the direction estimation accuracy from lowering and to reduce the calculation amount.

[Relative Delay Time Calculation Unit]

The microphone position information is input to the relative delay time calculation unit 13 from the signal selection unit 12. The relative delay time calculation unit 13 calculates the relative delay time between each microphone pair for all the microphone pairs selected by the signal selection unit 12, using a preset sound source search target direction (also referred to as sound source direction) and the microphone position information. The relative delay time means the arrival time difference between sound waves uniquely defined based on the microphone interval between two microphones and the sound source direction. For example, the sound source direction is set in increments of a predetermined angle. That is, the relative delay time calculation unit 13 calculates the relative delay time for the set sound source direction. The relative delay time calculation unit 13 outputs the calculated sound source direction and relative delay time as a set to the estimated-direction-information and frequency-contribution-rate generation unit 15.

The relative delay time is calculated using different methods depending on the positional relationship between the microphone pair. In the following, two positional relationships of the microphone pairs are demonstrated, and the calculation method for the relative delay time is indicated for each of these positional relationships of the microphone pairs.

Figure 2:
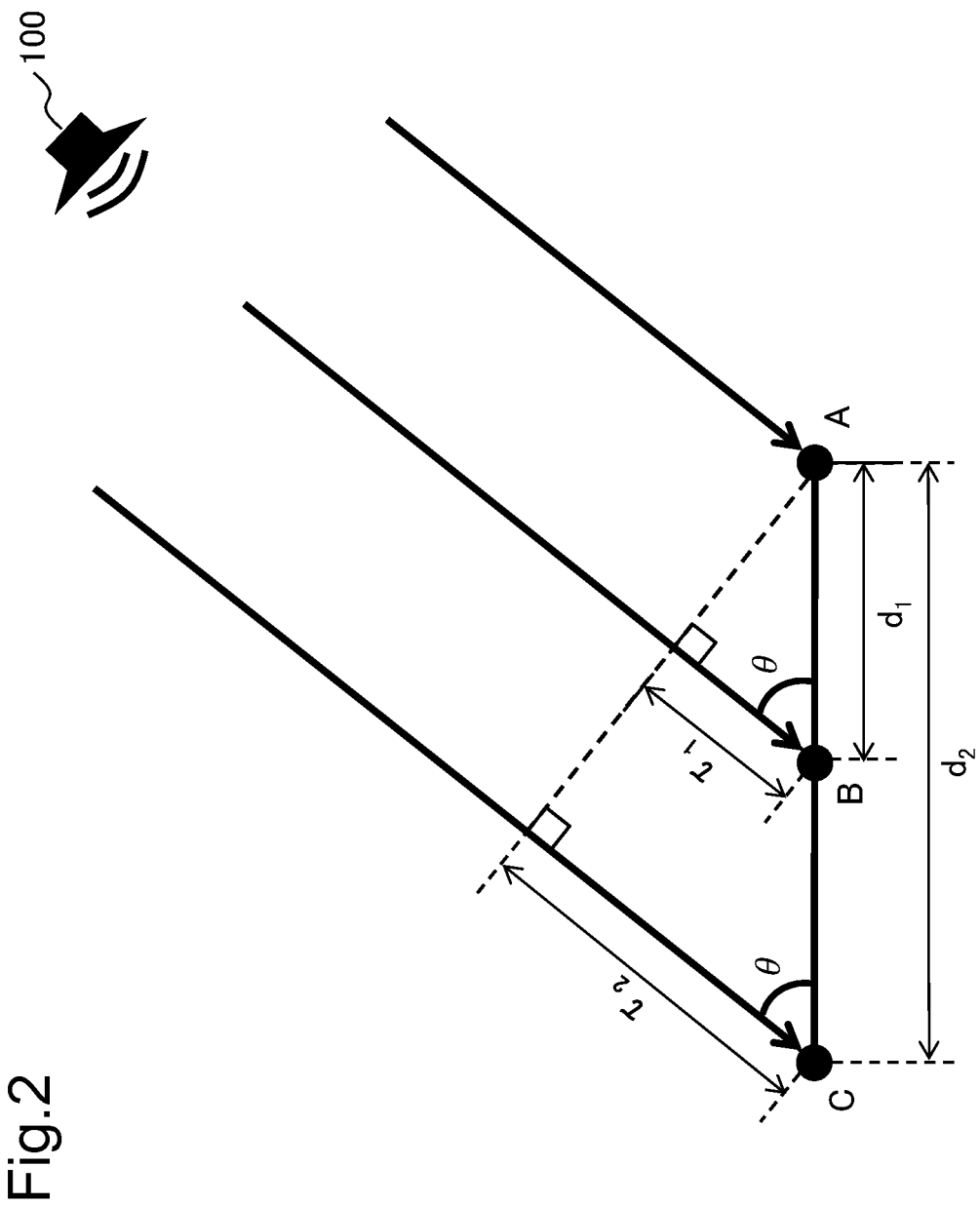
FIG. 2 is a conceptual diagram for explaining an example of a process of a relative delay time calculation unit of the wave-source-direction estimation device according to the first example embodiment of the present invention.

FIG. 2 is an example in which three microphones are arranged on the same straight line. Here, it is assumed that the sound velocity is c, the microphone interval is $d_r$, and the sound source direction is θ. The sound source direction θ is at least one angle set for estimating the direction of a sound source 100. At this time, a relative delay time $\tau_r(\theta)$ with respect to the sound source direction θ can be calculated using following formula 3.

$$\tau_r(\theta) = \frac{d_r \cos\theta}{c} \tag{3}$$

The microphone interval d differs depending on the combination of input signals selected by the signal selection unit 12. That is, the relative delay time $\tau_r(\theta)$ is different for each combination number r. For example, assuming that the microphone interval between a microphone pair AB is $d_1$, the relative delay time $\tau_1(\theta)$ of the microphone pair AB can be calculated using following formula 4.

$$\tau_1(\theta) = \frac{d_1 \cos\theta}{c} \tag{4}$$

Assuming that the microphone interval between a microphone pair AC in FIG. 2 is $d_2$, the relative delay time $\tau_2(\theta)$ of the microphone pair AC can be calculated using following formula 5.

$$\tau_2(\theta) = \frac{d_2 \cos\theta}{c} \tag{5}$$

As described above, when all microphones are positioned on the same straight line, the relative delay time $\tau_r(\theta)$ in regard to a given sound source 100 is proportional to the microphone interval d, but the sound source direction θ can be regarded as being the same as seen from any of the microphones.

Figure 3:
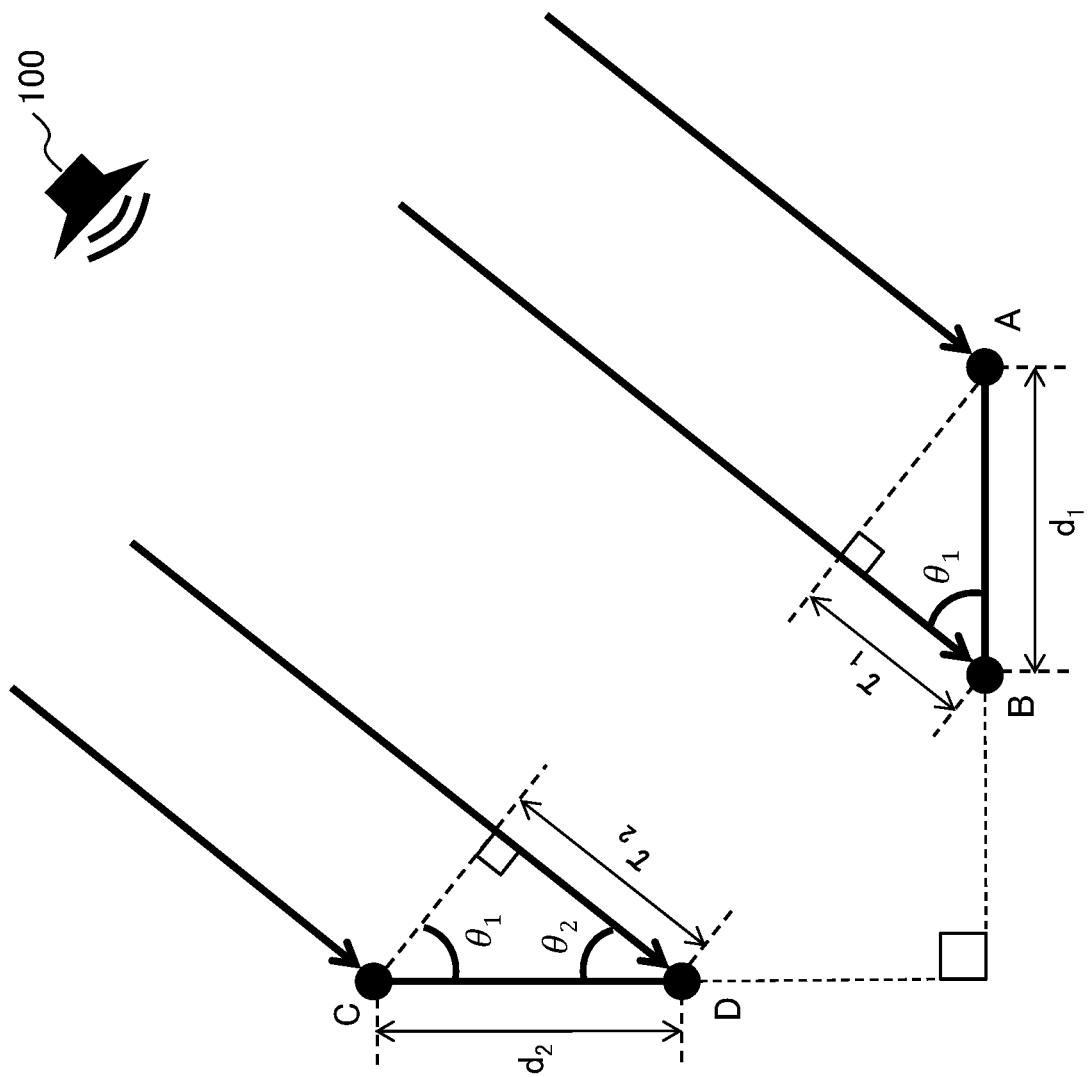
FIG. 3 is a conceptual diagram for explaining another example of a process of a relative delay time calculation unit of the wave-source-direction estimation device according to the first example embodiment of the present invention.

FIG. 3 is an example in which two microphone pairs are arranged on straight lines perpendicular to each other. In the example in FIG. 3, the sound source direction θ differs depending on the microphone pair. The relative delay time $\tau_1(\theta)$ of the microphone pair AB can be calculated using following formula 6.

$$\tau_1(\theta_1) = \frac{d_1 \cos\theta_1}{c} \tag{6}$$

Meanwhile, the relative delay time $\tau_2(\theta)$ of the microphone pair CD in FIG. 3 can be calculated using following formula 7.

$$\tau_2(\theta_1) = \frac{d_2 \cos\theta_2}{c} = \frac{d_2 \cos(90 - \theta_1)}{c} \tag{7}$$

In this manner, the relative delay time $\tau_r(\theta)$ of a given microphone pair relative to another microphone pair as a reference can be generalized as a function of the sound source direction θ as seen from the reference microphone pair, as indicated by following formula 8. Any microphone pair can be chosen as a reference microphone pair.

$$\tau_r(\theta) = \frac{d_r \cos\theta_r(\theta)}{c} \tag{8}$$

The relative delay time calculation unit 13 calculates the relative delay time for all the set sound source search target directions. For example, when the search range for sound source direction is from 0 to 90 degrees in increments of 10 degrees, the relative delay time calculation unit 13 calculates the relative delay times for 10 kinds of sound source directions, namely, 0 degrees, 10 degrees, 20 degrees, . . . , and 90 degrees. Then, the relative delay time calculation unit 13 outputs the sound source search target direction and the relative delay time to the estimated-direction-information and frequency-contribution-rate generation unit 15. However, the unit for segmenting the search range for sound source direction can be set freely according to the wanted accuracy. When the direction of the desired sound source is highly accurately worked out, the search range for sound source direction can be finely segmented.

[Estimated-Direction-Information and Frequency-Contribution-Rate Generation Unit]

Input signals of one microphone pair among all microphone pairs selected by the signal selection unit 12 are input to each of the estimated-direction-information and frequency-contribution-rate generation units 15-1 to 15-R. The relative delay times of the microphone pair that are the supply sources of the input signals are input from the relative delay time calculation unit 13 to each of the estimated-direction-information and frequency-contribution-rate generation units 15-1 to 15-R. Each of the estimated-direction-information and frequency-contribution-rate generation units 15-1 to 15-R generates estimated direction information and a frequency contribution rate between the input signals of the one microphone pair, using the input signals and the relative delay times of the one microphone pair. The estimated-direction-information and frequency-contribution-rate generation units 15-1 to 15-R output the estimated direction information to the integration unit 17 and output the frequency contribution rate to the weight calculation unit 16.

Figure 4:
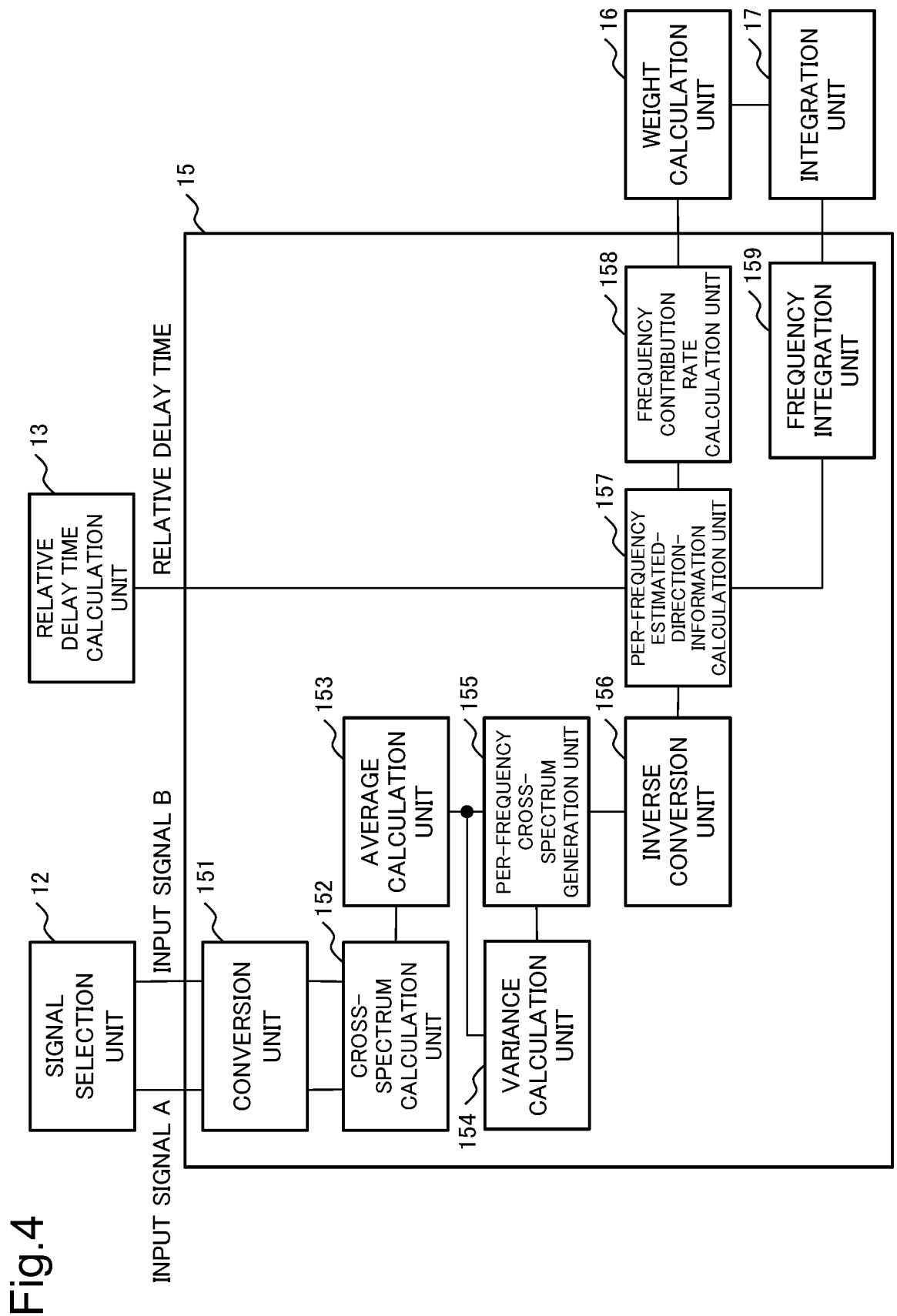
FIG. 4 is a block diagram illustrating an example of the configuration of an estimated-direction-information and frequency-contribution-rate generation unit of the wave-source-direction estimation device according to the first example embodiment of the present invention.

The detailed configuration of the estimated-direction-information and frequency-contribution-rate generation unit 15 will be described here with reference to FIG. 4. FIG. 4 is a block diagram illustrating an example of the configuration of the estimated-direction-information and frequency-contribution-rate generation unit 15. The estimated-direction-information and frequency-contribution-rate generation unit 15 includes a conversion unit 151, a cross-spectrum calculation unit 152, an average calculation unit 153, a variance calculation unit 154, a per-frequency cross-spectrum generation unit 155, an inverse conversion unit 156, and a per-frequency estimated-direction-information calculation unit 157. The estimated-direction-information and frequency-contribution-rate generation unit 15 further includes a frequency contribution rate calculation unit 158 and a frequency integration unit 159.

[Conversion Unit]

Input signals (an input signal A and an input signal B) of one microphone pair are input to the conversion unit 151 from the signal selection unit 12. The conversion unit 151 converts the two input signals supplied from the signal selection unit 12 into conversion signals in a frequency domain. The conversion unit 151 performs conversion to decompose the input signals into a plurality of frequency components. For example, the conversion unit 151 decomposes the input signal into a plurality of frequency components using the Fourier transform. The conversion unit 151 outputs the conversion signals to the cross-spectrum calculation unit 152.

For example, two kinds of input signals $x_m(t)$ are input to the conversion unit 151. m denotes the number given to the input terminal 11. The conversion unit 151 cuts out a waveform having an appropriate length from the input signal supplied from the input terminal 11 while shifting the waveform by a fixed period. The signal section thus cut out is referred to as frame, the length of the cut-out waveform is referred to as frame length, and the period by which the frame is shifted is referred to as frame period. Then, the conversion unit 151 converts the cut-out signal into a frequency-domain signal using the Fourier transform. Here, it is assumed that n is a frame number, and the input signal to be cut out is $x_m(t, n)$ (t=0, 1, . . . , K−1). At this time, the conversion unit 151 can calculate the Fourier transform $X_m(k, n)$ of the input signal $x_m(t, n)$ using following formula 9.

$$X_m(k, n) = \sum_{t=0}^{K-1} x_m(t, n) \exp\left(-j\frac{2\pi tk}{K}\right) \quad (9)$$

In above formula 9, j is an imaginary unit, exp is an exponential function, and K is an integer. Furthermore, k represents a frequency bin number and is an integer equal to or more than 0 but equal to or less than K−1. In the following, k is referred to as frequency instead of the frequency bin number.

[Cross-Spectrum Calculation Unit]

The conversion signals are input to the cross-spectrum calculation unit 152 from the conversion unit 151. The cross-spectrum calculation unit 152 calculates a cross spectrum using the conversion signals supplied from the conversion unit 151. The cross-spectrum calculation unit 152 outputs the calculated cross spectrum to the average calculation unit 153.

For example, the cross-spectrum calculation unit 152 calculates the product of the complex conjugate of the conversion signal $X_2(k, n)$ and the conversion signal $X_1(k, n)$ to calculate the cross spectrum. Here, the cross spectrum of the conversion signals is assumed to be $S_{12}(k, n)$. At this time, the cross-spectrum calculation unit 152 can calculate a cross spectrum $S_{12}(k, n)$ using following formula 10.

$$S_{12}(k,n) = X_1(k,n) \cdot conj(X_2(k,n)) \quad (10)$$

In formula 10, $conj(X_2(k, n))$ represents the complex conjugate of the conversion signal $X_2(k, n)$. Alternatively, instead of formula 10, a cross spectrum normalized by an amplitude component may be used. When performing normalization by an amplitude component, the cross-spectrum calculation unit 152 can calculate the cross spectrum $S_{12}(k, n)$ using following formula 11.

$$S_{12}(k, n) = \frac{X_1(k, n) \cdot conj(X_2(k, n))}{|X_1(k, n)||X_2(k, n)|} \quad (11)$$

[Average Calculation Unit]

The cross spectrum is input to the average calculation unit 153 from the cross-spectrum calculation unit 152. The average calculation unit 153 calculates an average (also referred to as average cross spectrum) of the cross spectrum supplied from the cross-spectrum calculation unit 152. The average calculation unit 153 outputs the calculated average cross spectrum to the per-frequency cross-spectrum generation unit 155.

Here, an example will be described in which the average calculation unit 153 calculates the average cross spectrum for each frequency bin from the cross spectra input in the past. The average calculation unit 153 may calculate the average cross spectrum not in units of frequency bins but in units of subbands in which a plurality of frequency bins is bundled. Here, a cross spectrum at a frequency bin k of an n-th frame is assumed to be $S_{12}(k, n)$. At this time, the average calculation unit 153 can calculate an average cross spectrum $SS_{12}(k, n)$ from past L frames, using following formula 12.

$$SS_{12}(k, n) = \frac{1}{L}\sum_{m=0}^{L-1} S_{12}(k, n-m) \quad (12)$$

Alternatively, the average calculation unit 153 may calculate the average cross spectrum $SS_{12}(k, n)$ using the leak integration in following formula 13. In formula 13, α is a real number more than 0 but less than 1.

$$SS_{12}(k,n)=(1-\alpha)SS_{12}(k,n-1)+\alpha S_{12}(k,n) \quad (13)$$

[Variance Calculation Unit]

The average cross spectrum is input to the variance calculation unit 154 from the average calculation unit 153. The variance calculation unit 154 calculates variance using the average cross spectrum supplied from the average calculation unit 153. The variance calculation unit 154 outputs the calculated variance to the per-frequency cross-spectrum generation unit 155.

Here, the average cross spectrum is assumed to be $SS_{12}(k, n)$. At this time, when the circular variance is used in the calculation of the phase variance of the cross spectrum, the variance calculation unit 154 calculates a variance $V_{12}(k, n)$ using following formula 14.

$$V_{12}(k,n)=1-|SS_{12}(k,n)| \quad (14)$$

The variance calculation unit 154 may calculate the variance $V_{12}(k, n)$ using following formula 15.

$$V_{12}(k,n)=1-SS_{12}(k,n)^2 \quad (15)$$

Alternatively, when the circular standard deviation is used, the variance calculation unit 154 can calculate the variance $V_{12}(k, n)$ using following formula 16.

$$V_{12}(k,n)=\sqrt{-2\ln|SS_{12}(k,n)|} \quad (16)$$

[Per-Frequency Cross-Spectrum Generation Unit]

The average cross spectrum is input to the per-frequency cross-spectrum generation unit 155 from the average calculation unit 153, and the variance is input to the per-frequency cross-spectrum generation unit 155 from the variance calculation unit 154. The per-frequency cross-spectrum generation unit 155 calculates a cross spectrum (also referred to as per-frequency cross spectrum) relevant to the frequency of the average cross spectrum, using the average cross spectrum and the variance. The per-frequency cross-spectrum generation unit 155 outputs the calculated per-frequency cross spectrum to the inverse conversion unit 156.

Figure 5:
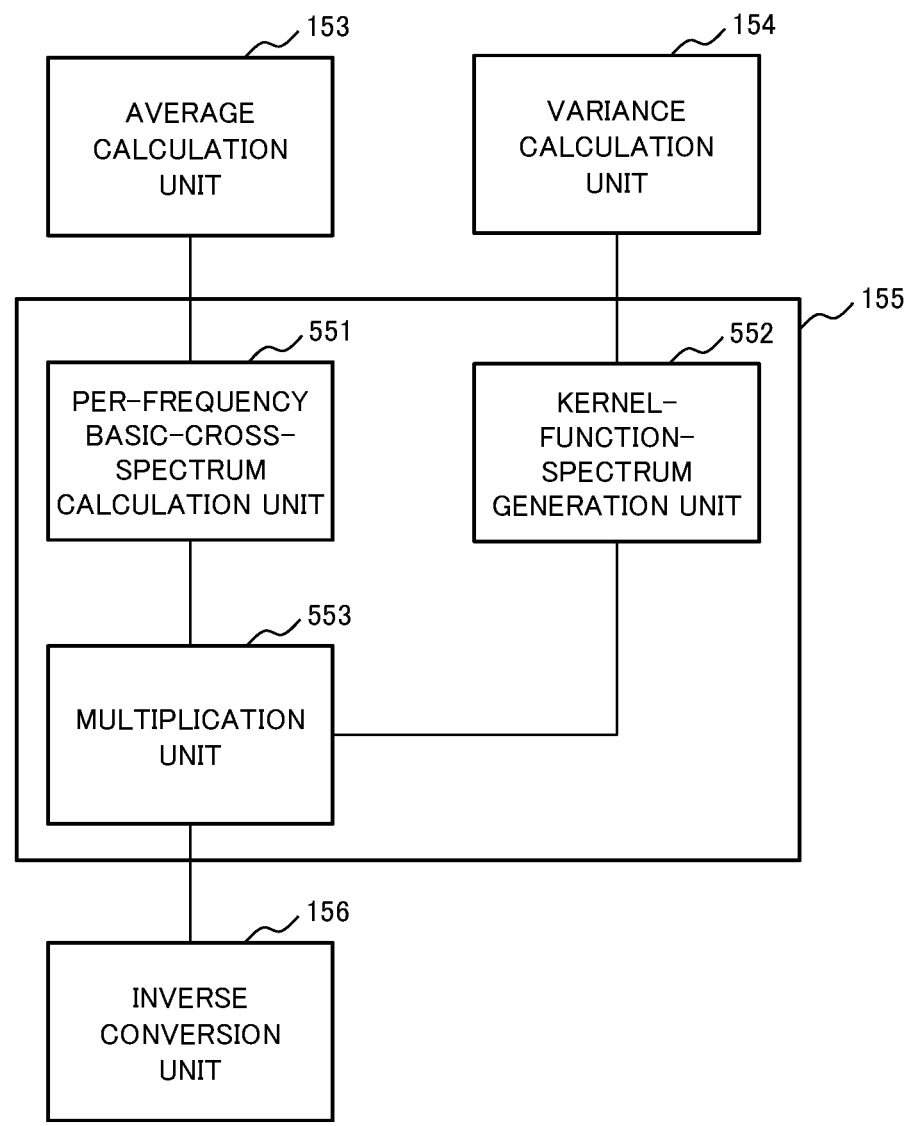
FIG. 5 is a block diagram illustrating an example of the configuration of a per-frequency cross-spectrum generation unit included in the estimated-direction-information and frequency-contribution-rate generation unit of the wave-source-direction estimation device according to the first example embodiment of the present invention.

The configuration of the per-frequency cross-spectrum generation unit 155 will be described here with reference to the drawings. FIG. 5 is a block diagram illustrating an example of the configuration of the per-frequency cross-spectrum generation unit 155. As illustrated in FIG. 5, the per-frequency cross-spectrum generation unit 155 includes a per-frequency basic-cross-spectrum calculation unit 551, a kernel-function-spectrum generation unit 552, and a multiplication unit 553.

[Per-Frequency Basic-Cross-Spectrum Calculation Unit]

The average cross spectrum is input to the per-frequency basic-cross-spectrum calculation unit 551 from the average calculation unit 153. The per-frequency basic-cross-spectrum calculation unit 551 calculates a cross spectrum (also referred to as per-frequency basic cross spectrum) relevant to each frequency of the average cross spectrum, using the average cross spectrum supplied from the average calculation unit 153. The per-frequency basic-cross-spectrum calculation unit 551 outputs the calculated per-frequency basic cross spectrum to the multiplication unit 553. The per-frequency basic cross spectrum is calculated to calculate a correlation function for each frequency component. The per-frequency basic-cross-spectrum calculation unit 551 calculates a per-frequency basic cross spectrum for working out a correlation function (also referred to as per-frequency cross-correlation function) relevant to a given frequency in a subsequent stage.

Here, an example will be described in detail in which the per-frequency basic-cross-spectrum calculation unit 551 calculates the per-frequency basic cross spectrum of the frequency k. When calculating the per-frequency basic cross spectrum using the average cross spectrum $SS_{12}(k, n)$ of the frequency k, the per-frequency basic-cross-spectrum calculation unit 551 works out a phase component and an amplitude component separately in advance, and then integrates the worked-out phase component and amplitude component.

Assuming the per-frequency basic cross spectrum of the frequency k as $U_k(w, n)$, its amplitude component as $|U_k(w, n)|$, and its phase component as $\arg(U_k(w, n))$, the following relationship in formula 17 holds. In formula 17, w represents a frequency and is an integer equal to or more than 0 but equal to or less than W−1 (W is an integer).

$$U_k(w,n) = |U_k(w,n)| \exp(j \cdot \arg(U_k(w,n))) \quad (17)$$

In the following, a method will be described in which the per-frequency basic-cross-spectrum calculation unit 551 works out the amplitude component $|U_k(w, n)|$ and the phase component $\arg(U_k(w, n))$ of the per-frequency basic cross spectrum, using the average cross spectrum $SS_{12}(k, n)$ of the frequency k.

For the amplitude component $|U_k(w, n)|$ of a frequency that is a constant multiple of k, 1.0 is used. On the other hand, the phase component of a frequency other than a constant multiple of k is set to zero. When the above is expressed as a mathematical formula, the amplitude component $|U_k(w, n)|$ is given by following formula 18. In formula 18, p is an integer equal to or more than 1 but equal to or less than P (P is an integer).

$$|U_k(w, n)| = \begin{cases} 1, & \text{if } w = p \cdot k \\ 0, & \text{if } w \neq p \cdot k \end{cases} \quad (18)$$

Since the phase component is the important information when the wave source direction is estimated, an appropriate constant is used for the amplitude component in formula 18. As the amplitude component $|U_k(w, n)|$ of a frequency that is a constant multiple of k, an absolute value $|SS_{12}(k, n)|$ of the average cross spectrum of the frequency k may be used instead of 1.0. That is, the per-frequency basic-cross-spectrum calculation unit 551 may work out the amplitude component $|U_k(w, n)|$ using following formula 19.

$$|U_k(w, n)| = \begin{cases} |SS_{12}(k, n)|, & \text{if } w = p \cdot k \\ 0, & \text{if } w \neq p \cdot k \end{cases} \quad (19)$$

For the phase component $\arg(U_k(w, n))$ of a frequency obtained by multiplying k by a constant, a value obtained by multiplying the average cross spectrum $SS_{12}(k, n)$ of the frequency k by a constant is used. For example, for the phase components of the frequencies k, 2k, 3k, and 4k, a value obtained by multiplying each phase component $\arg(SS_{12}(k, n))$ of the frequency k by an integer at the same magnification is used. That is, $\arg(SS_{12}(k, n))$, $2 \arg(SS_{12}(k, n))$, $3 \arg(SS_{12}(k, n))$, and $4 \arg(SS_{12}(k, n))$ are used for the phase components of the frequencies k, 2k, 3k, and 4k, respectively. On the other hand, the phase component of a frequency other than a constant multiple of k is set to zero. Accordingly, the phase component $\arg(U_k(w, n))$ of the per-frequency basic cross spectrum relevant to the frequency k is calculated using following formula 20. In the formula, p is an integer equal to or more than 1 but equal to or less than P>1).

$$\arg(U_k(w, n)) = \begin{cases} p \cdot \arg(SS_{12}(k, n)), & \text{if } w = p \cdot k \\ 0, & \text{if } w \neq p \cdot k \end{cases} \quad (20)$$

The per-frequency basic-cross-spectrum calculation unit 551 uses formula 17 to integrate the amplitude component calculated using formula 18 or 19 and the phase component calculated using formula 20, and calculates the per-frequency basic cross spectrum $U_k(w, n)$ of the frequency k.

In the method described so far, the amplitude component and the phase component are separately worked out, and then the per-frequency basic cross spectrum is calculated. However, when the power of the cross spectrum indicated by following formula 21 is used, the per-frequency basic cross spectrum $U_k(w, n)$ can be worked out without working out the amplitude component and the phase component.

$$U_k(w, n) = \begin{cases} SS_{12}(k, n)^p, & \text{if } w = p \cdot k \\ 0, & \text{if } w \neq p \cdot k \end{cases} \quad (21)$$

[Kernel-Function-Spectrum Generation Unit]

The variance is input to the kernel-function-spectrum generation unit 552 from the variance calculation unit 154.

The kernel-function-spectrum generation unit 552 calculates a kernel function spectrum using the variance supplied from the variance calculation unit 154. The kernel function spectrum is obtained by taking the absolute value of the Fourier transform performed on the kernel function. The kernel function spectrum may be obtained by taking the square of the Fourier transform performed on the kernel function. For the kernel function spectrum, a value obtained by taking the square of the absolute value of the Fourier transform performed on the kernel function may be used. The kernel-function-spectrum generation unit 552 outputs the calculated kernel function spectrum to the multiplication unit 553.

Here, an example will be given in which, assuming that the kernel function spectrum is G(w) and the kernel function is g(τ), a Gaussian function is used as the kernel function. At this time, the Gaussian function is given by following formula 22.

$$g(\tau) = g_1 \exp\left(-\frac{(\tau - g_2)^2}{2g_3^2}\right) \quad (22)$$

In formula 22, $g_1$, $g_2$, and $g_3$ are positive real numbers. The size of the Gaussian function is controlled by $g_1$, the position of the peak of the Gaussian function is controlled by $g_2$, and the spread of the Gaussian function is controlled by $g_3$. The sharpness of the peak of the per-frequency cross-correlation function is affected by $g_3$, which adjusts the spread of the Gaussian function. That is, formula 22 indicates that the greater $g_3$ is, the larger the spread of the Gaussian function is.

The probability density function of a logistic distribution in following formula 23 may be used as the kernel function. In formula 23, $g_4$ and $g_5$ are positive real numbers.

$$g(\tau) = \frac{\exp\left(-\frac{\tau - g_4}{g_5}\right)}{g_5\left(1 + \exp\left(-\frac{\tau - g_4}{g_5}\right)\right)^2} \quad (23)$$

The probability density function of the logistic distribution has a shape similar to the shape of the Gaussian function, but has a longer tail than the Gaussian function. As in $g_3$ in the Gaussian function in formula 22, $g_5$, which adjusts the spread of the probability density function of the logistic distribution, is a parameter that affects the sharpness of the peak of the per-frequency cross-correlation function. Besides the Gaussian function and the probability density function of the logistic distribution, a cosine function and a uniform function may be used for the kernel function.

Among the parameters of the kernel function, $g_3$ and $g_5$, which affect the spread of the kernel function, are determined using the variance input from the variance calculation unit 154. Here, the parameters that affect the spread of the kernel function, such as $g_3$ and $g_5$, are referred to as spread control parameters and are expressed as q(k, n). When the kernel function is a Gaussian function, $g_3$ is q(k, n). If the variance is small, the parameter is changed in such a way that the peak of the per-frequency cross-correlation function becomes sharper and the tail becomes narrower. In this case, the spread control parameter is made smaller.

The spread control parameter can be calculated by converting the value of the variance using a preset mapping function. For example, when the variance goes over a given threshold value, the spread control parameter is set to a large value (for example, 10), and when the variance falls below the given threshold value, the spread control parameter is set to a small value (for example, 0.01). Here, it is assumed that the variance is $V_{12}(k, n)$, and the threshold value is $p_{th}$. At this time, the spread control parameter q(k, n) at the frequency bin k of the n-th frame can be calculated using following formula 24. In formula 24, $q_1$ and $q_2$ are positive real numbers that satisfy $q_1 > q_2$.

$$q(k, n) = \begin{cases} q_1, & V_{12}(k, n) \geq p_{th} \\ q_2, & V_{12}(k, n) < p_{th} \end{cases} \quad (24)$$

The spread control parameter q(k, n) may be calculated using a linear function as in following formula 25. In formula 25, $q_3$ is a positive real number and $q_4$ is a real number.

$$q(k, n) = \begin{cases} q_3 V_{12}(k, n) + q_4, & q_3 V_{12}(k, n) + q_4 > 0 \\ 0, & \text{otherwise} \end{cases} \quad (25)$$

As $q_3$ and $q_4$, for example, values indicated by following formulas 26 and 27 may be used.

$$q_3 = 1/L \quad (26)$$

$$q_4 = 0 \quad (27)$$

L represents the number of frames averaged when the average calculation unit 153 works out the average cross spectrum. Since an error in the average cross spectrum is inversely proportional to the number of averaged frames L, the spread control parameter can be worked out by taking an error in the average cross spectrum (reliability) into consideration, by using formulas 26 and 27.

It is also possible to use a variance function represented by a linear mapping function, a high-order polynomial function, a nonlinear function, or the like to calculate the variance. The variance may be employed as the spread control parameter as it is.

The function that works out the spread control parameter may be constructed as a function for the frequency k as well as the variance. For example, a function that decreases as the frequency k increases can be used. Typical examples of such a function include an example using the inverse of k. In this case, instead of formula 24, the spread control parameter q(k, n) can be calculated using the function in following formula 28.

$$q(k, n) = \begin{cases} \dfrac{q_1}{k}, & V_{12}(k, n) \geq p_{th} \\ \dfrac{q_2}{k}, & V_{12}(k, n) < p_{th} \end{cases} \quad (28)$$

Instead of formula 25, the spread control parameter q(k, n) can be calculated using the function in following formula 29.

$$q(k, n) = \begin{cases} \dfrac{q_3 p(k, n) + q_4}{k}, & q_3 p(k, n) + q_4 > 0 \\ 0, & \text{otherwise} \end{cases} \quad (29)$$

[Multiplication Unit]

The per-frequency basic cross spectrum is input to the multiplication unit 553 from the per-frequency basic-cross-spectrum calculation unit 551, and the kernel function spectrum is input to the multiplication unit 553 from the kernel-function-spectrum generation unit 552. The multiplication unit 553 calculates the product of the per-frequency basic cross spectrum supplied from the per-frequency basic-cross-spectrum calculation unit 551 and the kernel function spectrum supplied from the kernel-function-spectrum generation unit 552 to calculate a per-frequency cross spectrum. The multiplication unit 553 outputs the calculated per-frequency cross spectrum to the inverse conversion unit 156.

Here, it is assumed that the per-frequency basic cross spectrum supplied from the per-frequency basic-cross-spectrum calculation unit 551 is $U_k(w, n)$, and the kernel function spectrum supplied from the kernel-function-spectrum generation unit 552 is $G(w)$. At this time, the multiplication unit 553 calculates a per-frequency cross spectrum $UM_k(w, n)$ using following formula 30.

$$UM_k(w,n) = G(w)U_k(w,n) \tag{30}$$

[Inverse Conversion Unit]

The per-frequency cross spectrum is input to the inverse conversion unit 156 from the multiplication unit 553 of the per-frequency cross-spectrum generation unit 155. For example, when the conversion unit 151 performs conversion using the Fourier transform, the inverse conversion unit 156 performs inverse conversion using the inverse Fourier transform. The inverse conversion unit 156 works out inverse conversion of the per-frequency cross spectrum supplied from the per-frequency cross-spectrum generation unit 155.

Here, the per-frequency cross spectrum supplied from the per-frequency cross-spectrum generation unit 155 is assumed to be $UM_k(w, n)$. At this time, the inverse conversion unit 156 inversely converts $UM_k(w, n)$ using following formula 31 to calculate a per-frequency cross-correlation function $u_k(\tau, n)$.

$$u_k(\tau, n) = \sum_{w=0}^{W-1} UM_k(w, n)\exp\left(j\frac{2\pi\tau w}{W}\right) \tag{31}$$

[Per-Frequency Estimated-Direction-Information Calculation Unit]

The per-frequency cross-correlation function is input to the per-frequency estimated-direction-information calculation unit 157 from the inverse conversion unit 156, and the relative delay time is input to the per-frequency estimated-direction-information calculation unit 157 from the relative delay time calculation unit 13. The per-frequency estimated-direction-information calculation unit 157 works out the correspondence relationship between the direction and the correlation value as per-frequency estimated direction information, using the per-frequency cross-correlation function supplied from the inverse conversion unit 156 and the relative delay times supplied from the relative delay time calculation unit 13. The per-frequency estimated-direction-information calculation unit 157 outputs the worked-out per-frequency estimated direction information to the integration unit 17.

Here, it is assumed that the per-frequency cross-correlation function is $u_k(\tau, n)$, and the relative delay time is $\tau_r(\theta)$.

At this time, the per-frequency estimated-direction-information calculation unit 157 calculates per-frequency estimated direction information $H_{k,r}(\theta, n)$ using following formula 32.

$$H_{k,r}(\theta,n) = u_k(\tau_r(\theta),n) \tag{32}$$

Using formula 32, since the correlation value is defined for each direction $\theta$, it can be determined that there is a high possibility that the sound source is present in a direction in which the correlation value is high.

[Frequency Contribution Rate Calculation Unit]

The per-frequency estimated direction information is input to the frequency contribution rate calculation unit 158 from the per-frequency estimated-direction-information calculation unit 157. The frequency contribution rate calculation unit 158 calculates a contribution rate per frequency (also referred to as frequency contribution rate) with respect to the estimated direction information generated for each sound source direction, based on the per-frequency estimated direction information supplied from the per-frequency estimated-direction-information calculation unit 157. The frequency contribution rate calculation unit 158 outputs the calculated frequency contribution rate to the weight calculation unit 16.

For example, the frequency contribution rate calculation unit 158 calculates a frequency contribution rate $y_{\theta', k', r}(n)$ of a frequency k' when the sound source direction $\theta$ is $\theta'$, using following formula 33.

$$y_{\theta',k',r}(n) = \frac{H_{k',r}(\theta', n)}{\sum_{k=0}^{K-1} H_{k,r}(\theta', n)} \tag{33}$$

Once the frequency contribution rate $y_{\theta', k', r}(n)$ denoted by formula 33 is worked out for all the sound source directions $\theta$ and all the frequencies k, the frequency contribution rate is rewritten as $y_{\theta, r}(k, n)$.

[Frequency Integration Unit]

The per-frequency estimated direction information is input to the frequency integration unit 159 from the per-frequency estimated-direction-information calculation unit 157. The frequency integration unit 159 integrates the per-frequency estimated direction information supplied from the per-frequency estimated-direction-information calculation unit 157. That is, the frequency integration unit 159 generates the estimated direction information that has been integrated, by integrating the per-frequency estimated direction information calculated separately for each frequency (frequency bin number) into one. For example, the frequency integration unit 159 integrates a plurality of pieces of per-frequency estimated direction information worked out individually into one piece of estimated direction information by merging or superposing. The frequency integration unit 159 outputs the estimated direction information that has been integrated, to the integration unit 17.

For example, the frequency integration unit 159 performs integration by calculating the sum of the per-frequency estimated direction information $H_{k, r}(\theta, n)$. In this case, the frequency integration unit 159 calculates the estimated direction information $H_r(\theta, n)$ using following formula 34.

$$H_r(\theta, n) = \sum_{k=0}^{K-1} H_{k,r}(\theta, n) \tag{34}$$

Alternatively, for example, the frequency integration unit 159 may perform integration by calculating the sum of powers of the per-frequency estimated direction information $H_{k, r}(\theta, n)$. In this case, the frequency integration unit 159 calculates the estimated direction information $H_r(\theta, n)$ using following formula 35.

$$H_r(\theta, n) = \prod_{k=0}^{K-1} H_{k,r}(\theta, n) \tag{35}$$

[Weight Calculation Unit]

The frequency contribution rate is input to the weight calculation unit 16 from the frequency contribution rate calculation unit 158 of each of the estimated-direction-information and frequency-contribution-rate generation units 15-1 to 15-R. The weight calculation unit 16 calculates a weight for each sound source direction according to the similarity of frequency contribution rates (also referred to simply as contribution rates) between the microphone pairs, based on the frequency contribution rates supplied from the estimated-direction-information and frequency-contribution-rate generation units 15-1 to 15-R. The weight calculation unit 16 outputs the weight calculated for each sound source direction to the integration unit 17.

Figure 6:
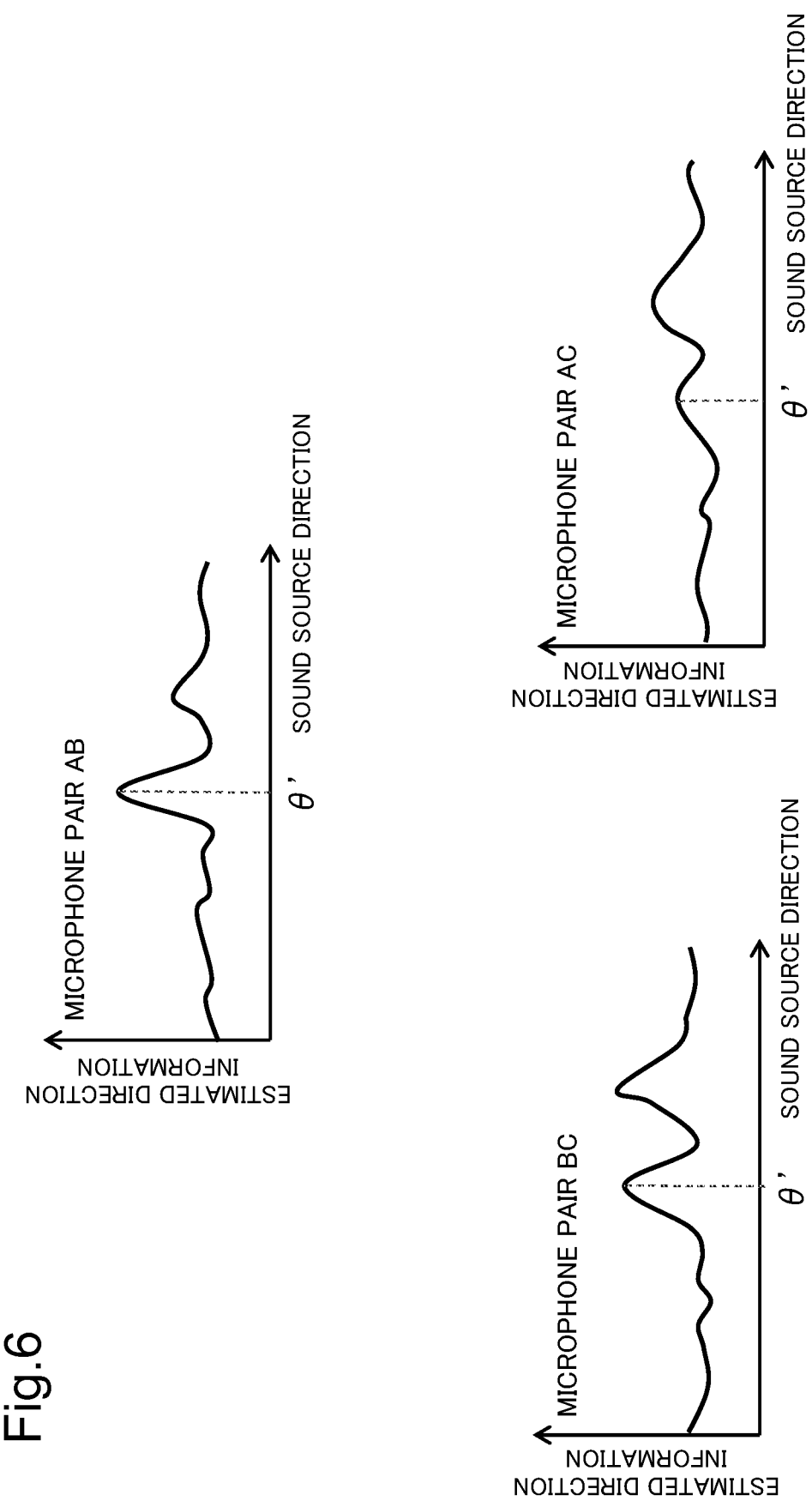
FIG. 6 is a conceptual diagram illustrating an example of estimated direction information calculated for each microphone pair by the estimated-direction-information and frequency-contribution-rate generation unit of the wave-source-direction estimation device according to the first example embodiment of the present invention.
Figure 7:
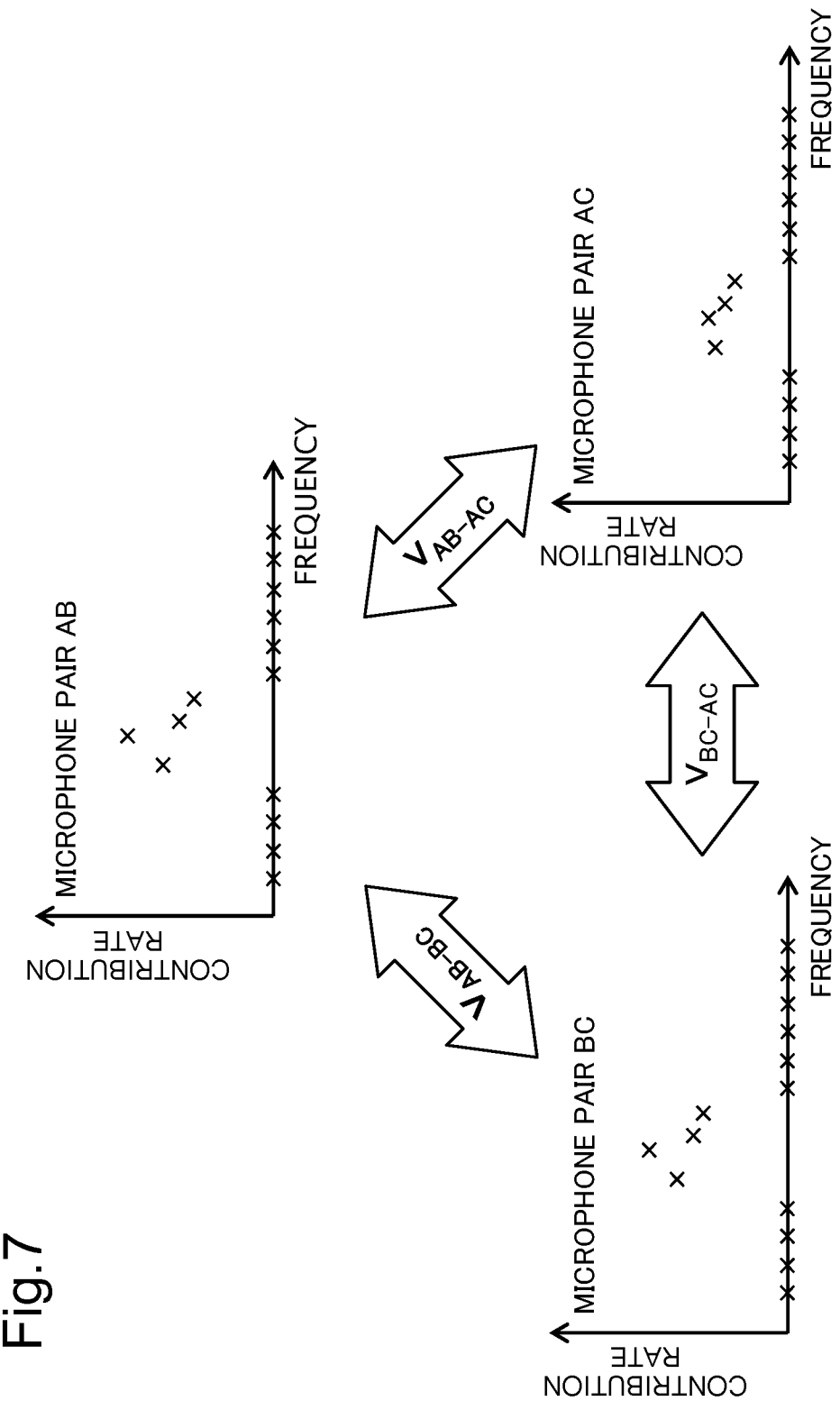
FIG. 7 is a conceptual diagram illustrating an example of frequency contribution rates calculated for each microphone pair by a weight calculation unit of the wave-source-direction estimation device according to the first example embodiment of the present invention.

A weight calculation method in an example in which the direction is estimated by three microphones will be described with reference to the drawings. FIG. 6 is an example of estimated direction information on all microphone pairs (AB, BC, and AC) calculated by the estimated-direction-information and frequency-contribution-rate generation unit 15 for the microphones A, B, and C. FIG. 7 illustrates frequency contribution rates for each microphone pair when the sound source direction $\theta$ is $\theta'$. The weight calculation unit 16 calculates a weight intended to become larger in a direction $\theta$ in which the contribution rates of different microphone pairs are more similar to each other.

For example, the weight calculation unit 16 calculates a similarity $v_{\theta, AB-BC}(n)$ between two microphone pairs by applying a frequency contribution rate $y_{\theta, AB}(k, n)$ of the microphone pair AB and a frequency contribution rate $y_{\theta, BC}(k, n)$ of the microphone pair BC to following formula 36.

$$v_{\theta, AB-BC}(n) = 1 - \left[ \frac{1}{K} \sum_{k=1}^{K} |y_{\theta, AB}(k, n) - y_{\theta, BC}(k, n)| \right] \tag{36}$$

When above formula 36 is generalized, the weight calculation unit 16 can calculate a similarity $v_{\theta, r'}(n)$ between a frequency contribution rate $y_{\theta, ri}(k, n)$ of a microphone pair $r_i$ and a frequency contribution rate $y_{\theta, rj}(k, n)$ of a microphone pair $r_j$ by applying the frequency contribution rate $y_{\theta, ri}(k, n)$ and the frequency contribution rate $y_{\theta, rj}(k, n)$ to following formula 37.

$$v_{\theta, r'}(n) = 1 - \left[ \frac{1}{K} \sum_{k=1}^{K} |y_{\theta, r_i}(k, n) - y_{\theta, r_j}(k, n)| \right] \tag{37}$$

In formula 37, r' represents a combination number of the microphone pair $r_i$ and the microphone pair $r_j$. When the frequency contribution rate $y_{\theta, ri}(k, n)$ of the microphone pair $r_i$ and the frequency contribution rate $y_{\theta, rj}(k, n)$ of the microphone pair $r_j$ coincide with each other, the similarity $v_{\theta, r'}(n)$ represented by formula 37 takes the maximum value 1.

For example, the weight calculation unit 16 calculates a weight $a_\theta$ for each sound source direction $\theta$ from the synergistic average of the similarity $v_{\theta, r'}(n)$ using following formula 38.

$$a_\theta(n) = \left( \prod_{r'=0}^{R-1} v_{\theta, r'}(n) \right)^{\frac{1}{R}} \tag{38}$$

For example, the weight calculation unit 16 can also calculate a weight $a_\theta(n)$ for each sound source direction $\theta$ from the arithmetic mean of the similarity $v_{\theta, r'}(n)$ using following formula 39.

$$a_\theta(n) = \frac{1}{R'} \sum_{r'=0}^{R'-1} v_{\theta, r'}(n) \tag{39}$$

The weight calculated as described above increases as the similarity between all microphone pairs is higher.

[Integration Unit]

The estimated direction information is input to the integration unit 17 from the estimated-direction-information and frequency-contribution-rate generation units 15-1 to 15-R and the weight is input to the integration unit 17 from the weight calculation unit 16. The integration unit 17 integrates the estimated direction information generated for each microphone pair, which has been supplied from the estimated-direction-information and frequency-contribution-rate generation unit 15-1 to 15-R, in terms of all microphone pairs, and generates integrated estimated direction information in which the weight supplied from the weight calculation unit 16 is assigned to the estimated direction information that has been integrated. The integration unit 17 integrates the estimated direction information generated for each microphone pair by taking the sum or the sum of powers of the estimated direction information, and generates the integrated estimated direction information by imparting the weight to the estimated direction information that has been integrated. The integration unit 17 outputs the generated integrated estimated direction information. For example, the integration unit 17 outputs the integrated estimated direction information to a higher-level system (not illustrated).

For example, using following formula 40, the integration unit 17 calculates the product of the weight $a_\theta(n)$ and the sum of powers of the estimated direction information $H_r(\theta, n)$, as the integrated estimated direction information $H(\theta, n)$.

$$H(\theta, n) = a_\theta(n) \cdot \prod_{r=0}^{R-1} H_r(\theta, n) \tag{40}$$

The above is the description of the configuration of the wave-source-direction estimation device 10 of the present example embodiment.

Figure 8:
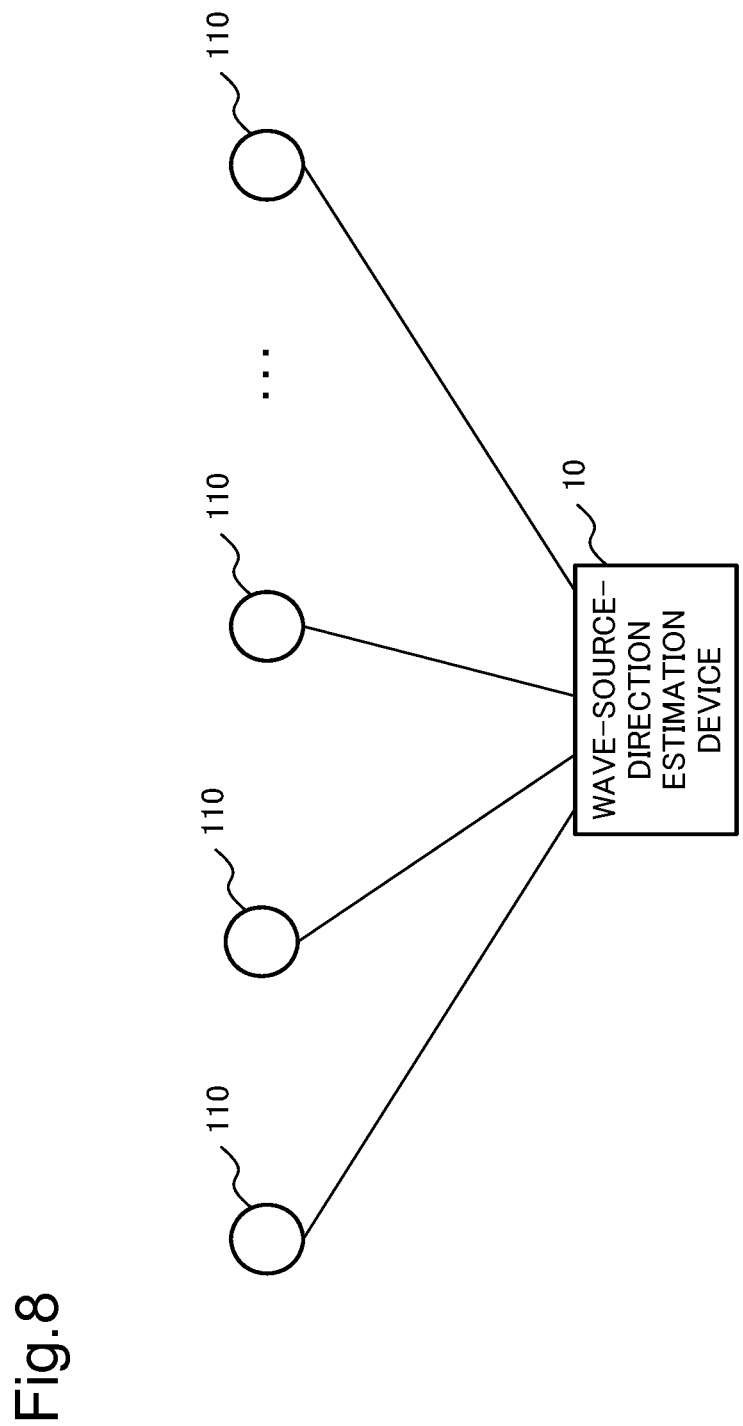
FIG. 8 is a block diagram illustrating an example of a configuration in which sensors are added to the wave-source-direction estimation device according to the first example embodiment of the present invention.

As illustrated in FIG. 8, a configuration in which at least one sensor 110 such as a microphone is added to the wave-source-direction estimation device 10 is also included in the scope of the present example embodiment. Each of the sensors 110 is connected to one of the input terminals 11 of the wave-source-direction estimation device 10 via a network or cable such as the Internet or an intranet.

For example, the sensor 110 is achieved by a microphone when detecting sound waves. For example, the sensor 110 is achieved by a vibration sensor when detecting vibration waves. For example, the sensor 110 is achieved by an antenna when detecting electromagnetic waves. As long as the sensor 110 can convert the target wave to be found into an electrical signal, no limitation is applied to the form of the sensor 110.

(Operation)

Figure 9:
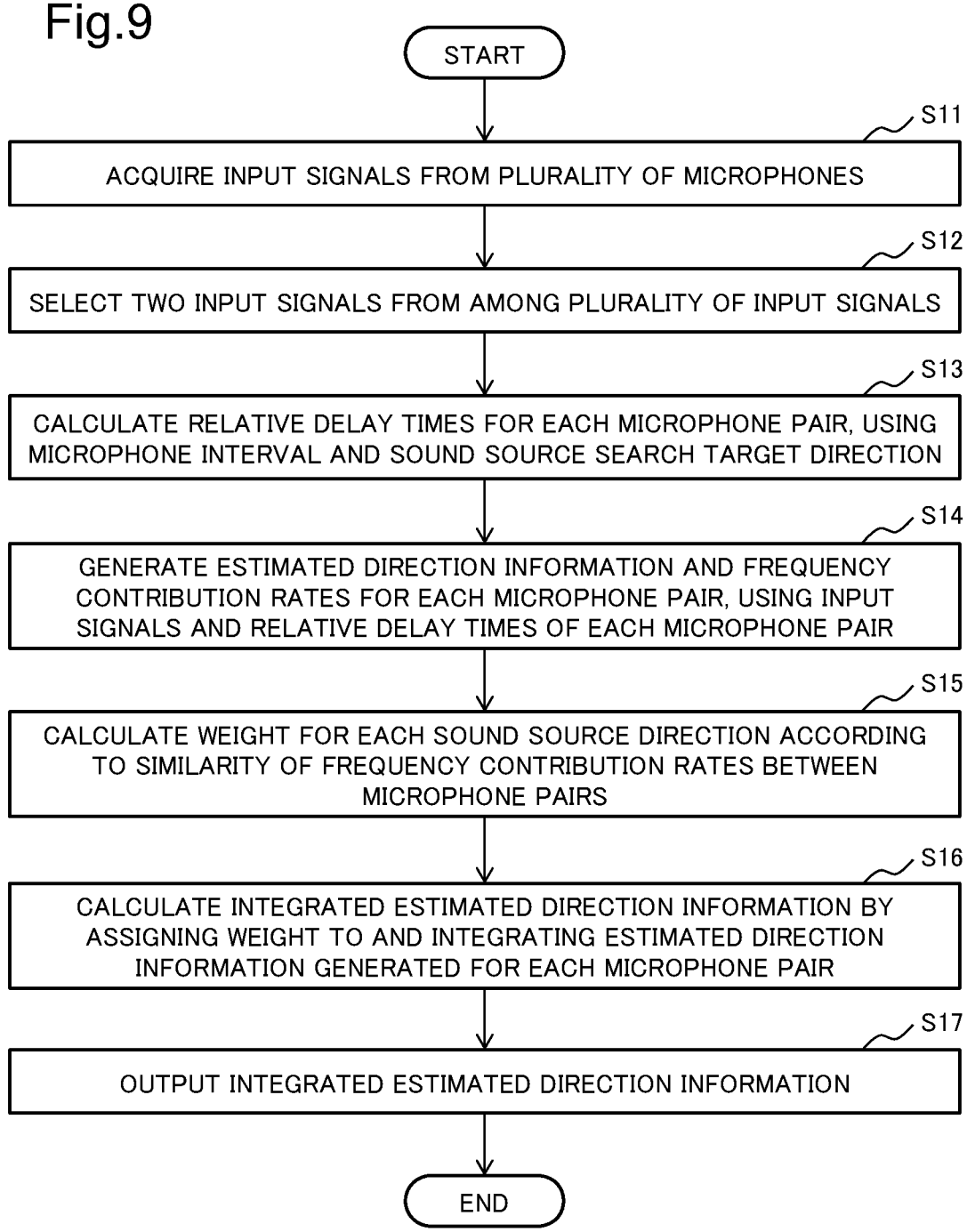
FIG. 9 is a flowchart for explaining an outline of the operation of the wave-source-direction estimation device according to the first example embodiment of the present invention.

Next, an outline of the operation of the wave-source-direction estimation device 10 of the present example embodiment will be described with reference to the drawings. FIG. 9 is a flowchart for explaining an outline of the operation of the wave-source-direction estimation device 10. In the description along the flowchart in FIG. 9, the wave-source-direction estimation device 10 will be described as the subject of the operation.

In FIG. 9, first, the wave-source-direction estimation device 10 acquires input signals from a plurality of microphones (step S11).

Next, the wave-source-direction estimation device 10 selects two input signals from among the input signals relevant to the plurality of microphones in a one-to-one manner (step S12). That is, the wave-source-direction estimation device 10 selects two microphones from among the plurality of microphones to make a microphone pair. Here, the wave-source-direction estimation device 10 selects a plurality of microphone pairs.

Next, the wave-source-direction estimation device 10 calculates the relative delay times for each microphone pair, using an interval (also referred to as microphone interval) between two microphones that are the supply sources of the two selected input signals, and the set sound source search target direction (also referred to as sound source direction) (step S13).

Next, the wave-source-direction estimation device 10 generates the estimated direction information and the frequency contribution rate between the input signals of the selected microphone pair, using the input signals and the relative delay times of the selected microphone pair (step S14). That is, the wave-source-direction estimation device 10 generates the estimated direction information and the frequency contribution rate for each microphone pair.

Next, the wave-source-direction estimation device 10 calculates the weight for each sound source direction according to the similarity of the frequency contribution rates between the microphone pairs (step S15).

Next, the wave-source-direction estimation device 10 calculates the integrated estimated direction information by assigning the weight to and integrating the estimated direction information generated for each microphone pair (step S16).

Then, the wave-source-direction estimation device 10 outputs the integrated estimated direction information (step S17).

The above is an outline of the operation of the wave-source-direction estimation device 10.

As described above, the wave-source-direction estimation device of the present example embodiment includes a plurality of input units, a signal selection unit, a relative delay time calculation unit, a plurality of estimated-direction-information and frequency-contribution-rate generation units, a weight calculation unit, and an integration unit.

The input units acquire, as input signals, electrical signals based on waves detected by a plurality of sensors.

The signal selection unit selects a plurality of pairs that are each a combination of two input signals from among a plurality of the input signals.

The relative delay time calculation unit calculates, as relative delay times, arrival time differences of the waves at the sensors that are supply sources of the two input signals composing each of the pairs, for each wave source direction.

The estimated-direction-information and frequency-contribution-rate generation units each acquire two input signals composing one of the pairs from among all pairs selected by the signal selection unit, and also acquire the relative delay times of the acquired pair. The estimated-direction-information and frequency-contribution-rate generation units each generate estimated direction information and one of the contribution rates per frequency between the two input signals composing the one of the pairs, using a per-frequency cross-correlation function between the two input signals composing the one of the pairs and the relative delay times of the one of the pairs.

The weight calculation unit acquires the contribution rates for each frequency from a plurality of the estimated-direction-information and frequency-contribution-rate generation units, and calculates a weight for each wave source direction according to a similarity of the contribution rates between different pairs among the pairs.

The integration unit acquires the estimated direction information from the plurality of the estimated-direction-information and frequency-contribution-rate generation units, also acquires the weight from the weight calculation unit, and assigns the weight to and integrates a plurality of pieces of the estimated direction information generated for each of the pairs to generate integrated estimated direction information.

For example, the estimated-direction-information and frequency-contribution-rate generation unit includes a conversion unit, a cross-spectrum calculation unit, an average calculation unit, a variance calculation unit, a per-frequency cross-spectrum generation unit, an inverse conversion unit, a per-frequency estimated-direction-information calculation unit, a frequency integration unit, and a frequency contribution rate calculation unit. The conversion unit converts the two input signals composing one of the pairs into conversion signals in a frequency domain. The cross-spectrum calculation unit calculates a cross spectrum using the conversion signals that have been converted by the conversion unit. The average calculation unit calculates an average cross spectrum using the cross spectrum calculated by the cross-spectrum calculation unit. The variance calculation unit calculates variance using the average cross spectrum calculated by the average calculation unit. The per-frequency cross-spectrum generation unit calculates a per-frequency cross spectrum using the average cross spectrum calculated by the average calculation unit and the variance calculated by the variance calculation unit. The inverse conversion unit inversely converts the frequency cross spectrum calculated by the per-frequency cross-spectrum generation unit to calculate a per-frequency cross-correlation function. The per-frequency estimated-direction-information calculation unit calculates per-frequency estimated direction information that is a correspondence relationship between the wave source direction and a correlation value, based on the per-frequency cross-correlation function and the relative delay times of the one of the pairs. The frequency integration unit integrates the per-frequency estimated direction information to calculate the estimated direction information. The frequency contribution rate calculation unit calculates the contribution rates per frequency with respect to the estimated direction information generated for each wave source direction, based on the per-frequency estimated direction information.

For example, the weight calculation unit calculates the similarity of the contribution rates between the plurality of pairs, and calculates the weight for each wave source direction based on the calculated similarity.

The wave-source-direction estimation device of the present example embodiment works out the estimated direction information from the cross-correlation function of the input signals of each microphone pair, and integrates the estimated direction information between a plurality of microphone pairs. As a result, according to the wave-source-direction estimation device of the present example embodiment, since the false peak of the estimated direction information in a direction other than the sound source direction, which can be generated when the phases coincidentally match with each other between a given microphone pair, is made smaller, the direction of the sound source can be highly accurately estimated without erroneous estimation of a virtual-image sound source.

Second Example Embodiment

Next, a wave-source-direction estimation device according to a second example embodiment of the present invention will be described with reference to the drawings.

Figure 10:
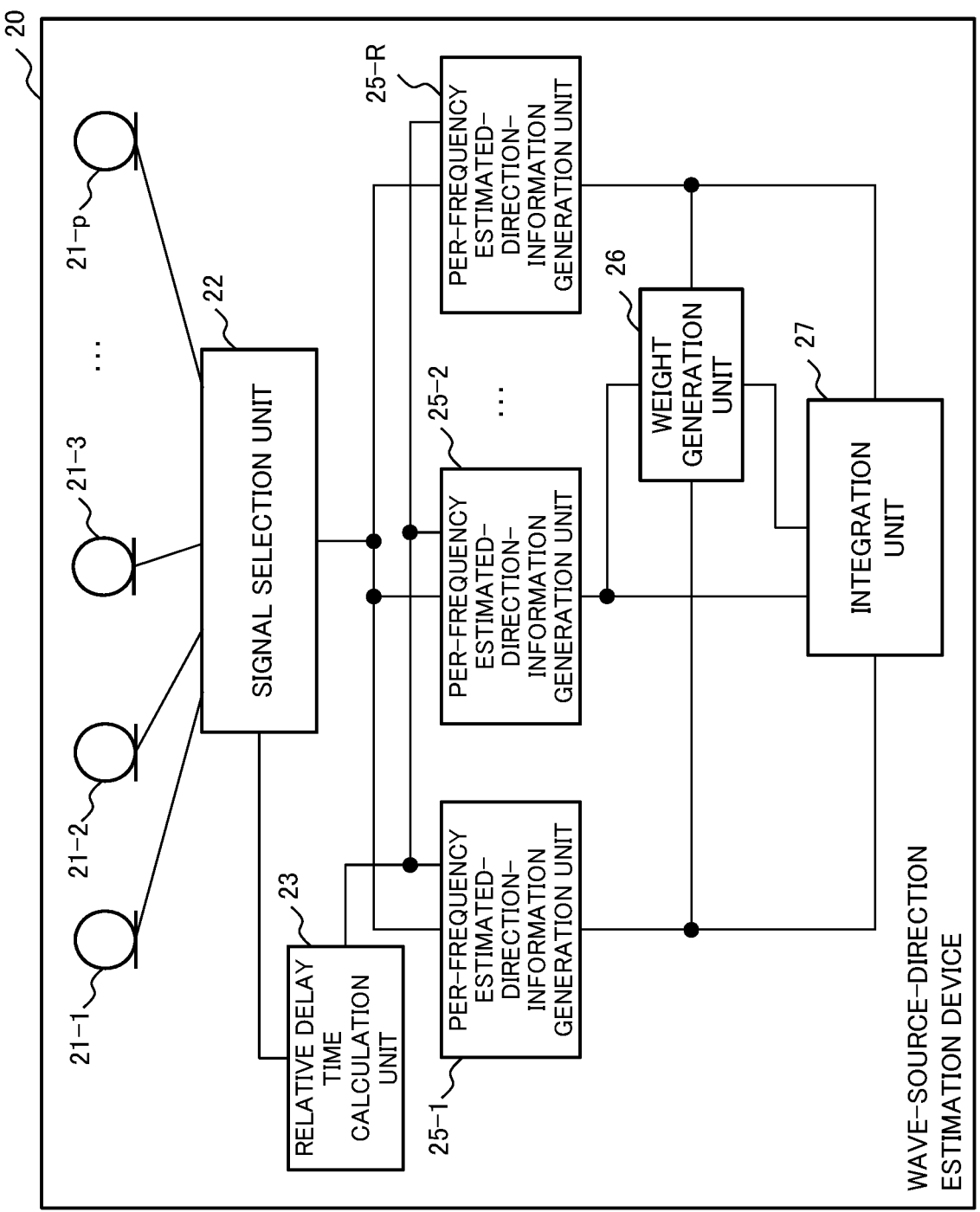
FIG. 10 is a block diagram illustrating an example of the configuration of a wave-source-direction estimation device according to a second example embodiment of the present invention.

FIG. 10 is a block diagram illustrating an example of the configuration of a wave-source-direction estimation device 20 of the present example embodiment. As illustrated in FIG. 10, the wave-source-direction estimation device 20 includes a plurality of input terminals 21, a signal selection unit 22, a relative delay time calculation unit 23, a plurality of per-frequency estimated-direction-information generation units 25, a weight generation unit 26, and an integration unit 27. In the following, the description of configuration and operation similar to those of the wave-source-direction estimation device 10 of the first example embodiment will be omitted in some cases.

[Input Terminal]

Each of a plurality of the input terminals 21-1 to 21-$p$ (also referred to as input units) is connected to a microphone (not illustrated) ($p$ is an integer equal to or more than 2). Electrical signals that have been converted from sound waves (also referred to as sound signals) collected by microphones arranged at different positions are input as input signals to each of the plurality of the input terminals 21-1 to 21-$p$. Since the input terminals 21-1 to 21-$p$ are similar to the input terminals 21-1 to 21-$p$ of the first example embodiment, a detailed description thereof will be omitted.

[Signal Selection Unit]

The signal selection unit 22 selects two input signals from among $p$ input signals supplied to the input terminals 21-1 to 21-$p$. The signal selection unit 22 outputs the two selected input signals to the per-frequency estimated-direction-information generation units 25-1 to 25-R, and outputs position information (hereinafter also referred to as microphone position information) on the microphones that are the supply sources of the input signals, to the relative delay time calculation unit 23 (R is an integer equal to or more than 1). Since the signal selection unit 22 is similar to the signal selection unit 12 of the first example embodiment, a detailed description thereof will be omitted.

[Relative Delay Time Calculation Unit]

The microphone position information is input to the relative delay time calculation unit 23 from the signal selection unit 22. The relative delay time calculation unit 23 calculates the relative delay time between each microphone pair for all the microphone pairs selected by the signal selection unit 22, using a preset sound source search target direction (also referred to as sound source direction) and the microphone position information. The relative delay time calculation unit 23 outputs the set sound source direction and relative delay time as a set to the per-frequency estimated-direction-information generation unit 25. Since the relative delay time calculation unit 23 is similar to the relative delay time calculation unit 13 of the first example embodiment, a detailed description thereof will be omitted.

[Per-Frequency Estimated-Direction-Information Generation Unit]

Input signals of one microphone pair among all microphone pairs selected by the signal selection unit 22 are input to each of the per-frequency estimated-direction-information generation units 25-1 to 25-R. The relative delay times of the microphone pair that are the supply sources of the input signals are input from the relative delay time calculation unit 23 to each of the per-frequency estimated-direction-information generation units 25-1 to 25-R. Each of the per-frequency estimated-direction-information generation units 25-1 to 25-R generates per-frequency estimated direction information for each one microphone pair, using the input signals and the relative delay times of the one microphone pair. The per-frequency estimated-direction-information generation units 25-1 to 25-R output the per-frequency estimated direction information generated for each microphone pair to the weight generation unit 26 and the integration unit 27.

Figure 11:
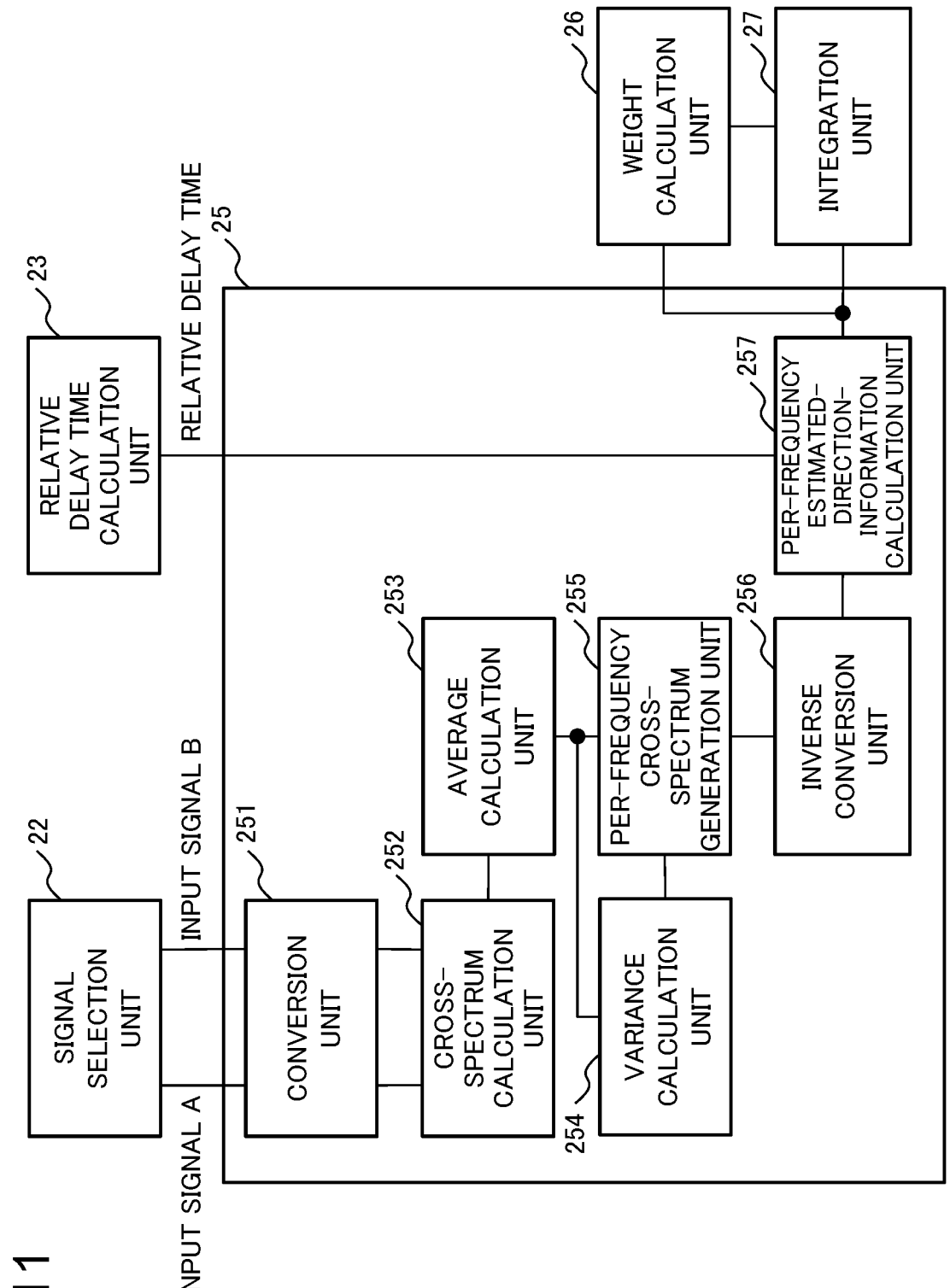
FIG. 11 is a block diagram illustrating an example of the configuration of a per-frequency estimated-direction-information generation unit of the wave-source-direction estimation device according to the second example embodiment of the present invention.

The detailed configuration of the per-frequency estimated-direction-information generation unit 25 will be described here with reference to FIG. 11. FIG. 11 is a block diagram illustrating an example of the configuration of the per-frequency estimated-direction-information generation unit 25. The per-frequency estimated-direction-information generation unit 25 includes a conversion unit 251, a cross-spectrum calculation unit 252, an average calculation unit 253, a variance calculation unit 254, a per-frequency cross-spectrum generation unit 255, an inverse conversion unit 256, and a per-frequency estimated-direction-information calculation unit 257. That is, the per-frequency estimated-direction-information generation unit 25 has a configuration in which the frequency integration unit 159 and the frequency contribution rate calculation unit 158 are excluded from the estimated-direction-information and frequency-contribution-rate generation unit 15 of the first example embodiment. The conversion unit 251, the cross-spectrum calculation unit 252, the average calculation unit 253, the variance calculation unit 254, the per-frequency cross-spectrum generation unit 255, the inverse conversion unit 256, and the per-frequency estimated-direction-information calculation unit 257 have configurations similar to the relevant configurations in the first example embodiment. Therefore, the detailed description of the conversion unit 251, the cross-spectrum calculation unit 252, the average calculation unit 253, the variance calculation unit 254, the per-frequency cross-spectrum generation unit 255, the inverse conversion unit 256, and the per-frequency estimated-direction-information calculation unit 257 will be omitted.

[Weight Generation Unit]

The per-frequency estimated direction information generated for each microphone pair is input to the weight generation unit 26 from each of the per-frequency estimated-direction-information generation units 25-1 to 25-R. The weight generation unit 26 calculates a weight for each sound source direction in which the estimated direction information has a peak, using the per-frequency estimated direction information generated for each microphone pair, that has been supplied from each of the per-frequency estimated-direction-information generation units 25-1 to 25-R. The weight generation unit 26 outputs the weight calculated for each sound source direction to the integration unit 27.

Figure 12:
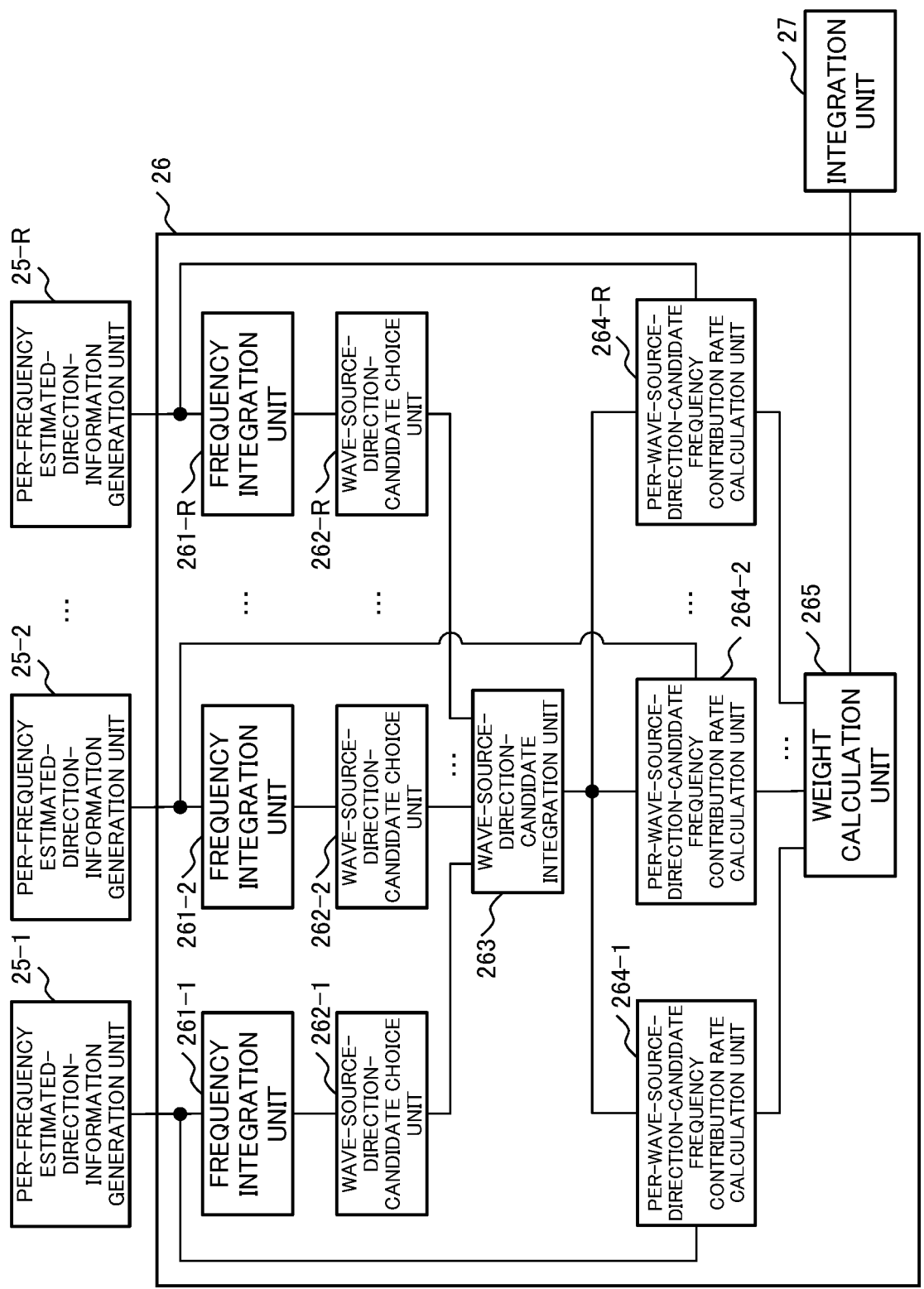
FIG. 12 is a block diagram illustrating an example of the configuration of a weight generation unit of the wave-source-direction estimation device according to the second example embodiment of the present invention.

The detailed configuration of the weight generation unit 26 will be described here with reference to FIG. 12. FIG. 12 is a block diagram illustrating an example of the configuration of the weight generation unit 26. The weight generation unit 26 includes a plurality of frequency integration units 261-1 to 261-R, a plurality of wave-source-direction-candidate choice units 262-1 to 262-R, a wave-source-direction-candidate integration unit 263, a plurality of per-wave-source-direction-candidate frequency contribution rate calculation units 264-1 to 264-R, and a weight calculation unit 265. Each of the frequency integration units 261-1 to 261-R, the wave-source-direction-candidate choice units 262-1 to 262-R, and the per-wave-source-direction-candidate frequency contribution rate calculation units 264-1 to 264-R is associated with one of the microphone pairs. Therefore, a number (1 to R) given to the microphone pair is given to each of the frequency integration units 261-1 to 261-R, the wave-source-direction-candidate choice units 262-1 to 262-R, and the per-wave-source-direction-candidate frequency contribution rate calculation units 264-1 to 264-R.

[Frequency Integration Unit]

The per-frequency estimated direction information is input to each of the frequency integration units 261-1 to 261-R from relevant one of the per-frequency estimated-direction-information generation units 25-1 to 25-R. Each of the frequency integration units 261-1 to 261-R integrates the per-frequency estimated direction information supplied from relevant one of the per-frequency estimated-direction-information generation units 25-1 to 25-R to calculate the estimated direction information. Since the operation of the frequency integration units 261 is similar to the operation of the frequency integration unit 159 of the first example embodiment, a detailed description thereof will be omitted. Each of the frequency integration units 261-1 to 261-R outputs the calculated estimated direction information to relevant one of the wave-source-direction-candidate choice units 262-1 to 262-R.

[Wave-Source-Direction-Candidate Choice Unit]

The estimated direction information is input to each of the wave-source-direction-candidate choice units 262-1 to 262-R from relevant one of the frequency integration units 261-1 to 261-R. Each of the wave-source-direction-candidate choice units 262-1 to 262-R detects a peak from the estimated direction information supplied from relevant one of the frequency integration units 261-1 to 261-R, and chooses the direction of the peak as a wave source direction candidate. Each of the wave-source-direction-candidate choice units 262-1 to 262-R outputs the chosen wave source direction candidate to the wave-source-direction-candidate integration unit 263.

For example, the wave-source-direction-candidate choice unit 262 chooses a sound source direction θ in which the estimated direction information takes a local maximum value, as a wave source direction candidate. Alternatively, for example, when the number of sound sources can be presumed to be three beforehand, the wave-source-direction-candidate choice unit 262 may pick up three peaks in the order from larger estimated direction information, and choose sound source directions θ that take these three values, as the wave source direction candidates. In particular, when the number of sound sources can be presumed to be one beforehand, the wave-source-direction-candidate choice unit 262 chooses a sound source direction θ in which the estimated direction information has a maximum value, as a wave source direction candidate. In this case, assuming that the estimated direction information supplied from the frequency integration unit 261 is $H_r(\theta, n)$, the wave-source-direction-candidate choice unit 262 works out a set having, as an element, an argument of the estimated direction information $H_r(\theta, n)$ supposed to allow the estimated direction information $H_r(\theta, n)$ to take a maximum value, using following formula 41.

$$\varphi_r(n) = \underset{\theta}{\operatorname{argmax}} H_r(\theta, n) \quad (41)$$

[Wave-Source-Direction-Candidate Integration Unit]

The wave source direction candidate is input to the wave-source-direction-candidate integration unit 263 from each of the wave-source-direction-candidate choice units 262-1 to 262-R. The wave-source-direction-candidate integration unit 263 integrates the wave source direction candidate chosen by each of the wave-source-direction-candidate choice units 262-1 to 262-R. The wave-source-direction-candidate integration unit 263 outputs the integrated wave source direction candidates to each of the per-wave-source-direction-candidate frequency contribution rate calculation units 264-1 to 264-R.

Here, a plurality of wave source direction candidates chosen for each microphone pair by the respective wave-source-direction-candidate choice units 262-1 to 262-R are assumed as vectors $\varphi_i$. The wave-source-direction-candidate integration unit 263 integrates the wave source direction candidates using following formula 42, and calculates an integrated wave source direction candidates $\Phi'_i(n)$.

$$\Phi'_i(n) = (\varphi_0(n), \varphi_1(n), \ldots, \varphi_{R-1}(n)) \quad (42)$$

Here, when there are directions that have overlapping components of $\Phi'_i(n)$, the wave-source-direction-candidate integration unit 263 excludes the overlapping directions, and integrates the wave source direction candidates chosen for each microphone pair in terms of all the microphone pairs, using following formula 43, to calculate the integrated wave source direction candidates $\Phi'_i(n)$. In formula 43, I indicates the number of all wave source direction candidates.

$$\Phi'_i(n) = (\varphi_0(n), \varphi_1(n), \ldots, \varphi_{I-1}(n)) \quad (43)$$

[Per-Wave-Source-Direction-Candidate Frequency Contribution Rate Calculation Unit]

The per-frequency estimated direction information generated for each microphone pair is input to each of the per-wave-source-direction-candidate frequency contribution rate calculation units 264-1 to 264-R from relevant one of the per-frequency estimated-direction-information generation units 25-1 to 25-R. The integrated wave source direction candidates are input to each of the per-wave-source-direction-candidate frequency contribution rate calculation units 264-1 to 264-R from the wave-source-direction-candidate integration unit 263. Each of the per-wave-source-direction-candidate frequency contribution rate calculation units 264-1 to 264-R calculates a per-wave-source-direction-candidate frequency contribution rate, which is a frequency contribution rate with respect to the estimated direction information generated for each wave source direction candidate, using the per-frequency estimated direction information generated for each microphone pair and the integrated wave source direction candidates. Each of the per-wave-source-direction-candidate frequency contribution rate calculation units 264-1 to 264-R outputs the calculated per-wave-source-direction-candidate frequency contribution rate to the weight calculation unit 265. The frequency contribution rate calculation unit 158 of the first example embodiment works out the frequency contribution rates for all sound source directions. In contrast to this, the per-wave-source-direction-candidate frequency contribution rate calculation unit 264 of the present example embodiment works out the frequency contribution rate for the chosen wave source direction candidate.

For example, the per-wave-source-direction-candidate frequency contribution rate calculation unit 264 calculates a per-wave-source-direction-candidate frequency contribution rate $y_{\varphi i, r}(k, n)$ of the frequency k of a given wave source direction candidate $\varphi_i$, using following formula 44. In formula 44, $H_{k, r}(\Phi_i, n)$ indicates the per-frequency estimated direction information.

$$y_{\varphi_i, r}(k, n) = \frac{H_{k,r}(\varphi_i, n)}{\sum_{k=0}^{K-1} H_{k,r}(\varphi_i, n)} \quad (44)$$

[Weight Calculation Unit]

The per-wave-source-direction-candidate frequency contribution rate is input to the weight calculation unit 265 from each of the per-wave-source-direction-candidate frequency contribution rate calculation units 264-1 to 264-R. The weight calculation unit 265 calculates the weight for each wave source direction candidate according to the similarity of the frequency contribution rates between microphone pairs, using the per-wave-source-direction-candidate frequency contribution rate supplied from each of the per-wave-source-direction-candidate frequency contribution rate calculation units 264-1 to 264-R. The weight calculation unit 265 outputs the weight calculated for each wave source direction candidate to the integration unit 27.

The weight calculation unit 16 of the first example embodiment works out the weights for all sound source directions. In contrast to this, the weight calculation unit 265 of the present example embodiment works out the weights for the wave source direction candidates. The weight calculated for each wave source direction candidate by the weight calculation unit 265 is denoted as $a_\Phi(n)$. Since the other operations of the weight calculation unit 265 are similar to those of the weight calculation unit 16, a detailed description thereof will be omitted.

[Integration Unit]

The per-frequency estimated direction information is input to the integration unit 27 from each of the per-frequency estimated-direction-information generation units 25-1 to 25-R, and the weight calculated for each wave source direction candidate is input to the integration unit 27 from the weight generation unit 26. The integration unit 27 integrates the per-frequency estimated direction information supplied from the per-frequency estimated-direction-information generation units 25-1 to 25-R in terms of all microphone pairs for each wave source direction candidate, and assigns the weight to the per-frequency estimated direction information integrated for each wave source direction candidate to calculate the integrated estimated direction information for each wave source direction candidate. The integration unit 27 integrates the per-frequency estimated direction information generated for each microphone pair by taking the sum or the synergy of the per-frequency estimated direction information, and generates the integrated estimated direction information for each wave source direction candidate by imparting the weight to the estimated direction information that has been integrated. For example, the integration unit 27 calculates the integrated estimated direction information $H(\Phi, n)$ for each wave source direction candidate $\Phi$ using following formula 45.

$$H(\Phi, n) = a_\Phi(n) \cdot \prod_{r=0}^{R-1} H_r(\Phi, n) \quad (45)$$

In formula 45, the integrated estimated direction information $H(\Phi, n)$ represents estimated direction information in which the per-frequency estimated direction information is integrated for each wave source direction candidate $\Phi$. The integration unit 27 calculates the integrated estimated direction information $H(\Phi, n)$ in a similar manner to the frequency integration unit 261. However, while the frequency integration unit 261 works out the estimated direction information for all the sound source directions, the integration unit 27 works out the estimated direction information for the wave source direction candidate $\Phi$.

(Operation)

Figure 13:
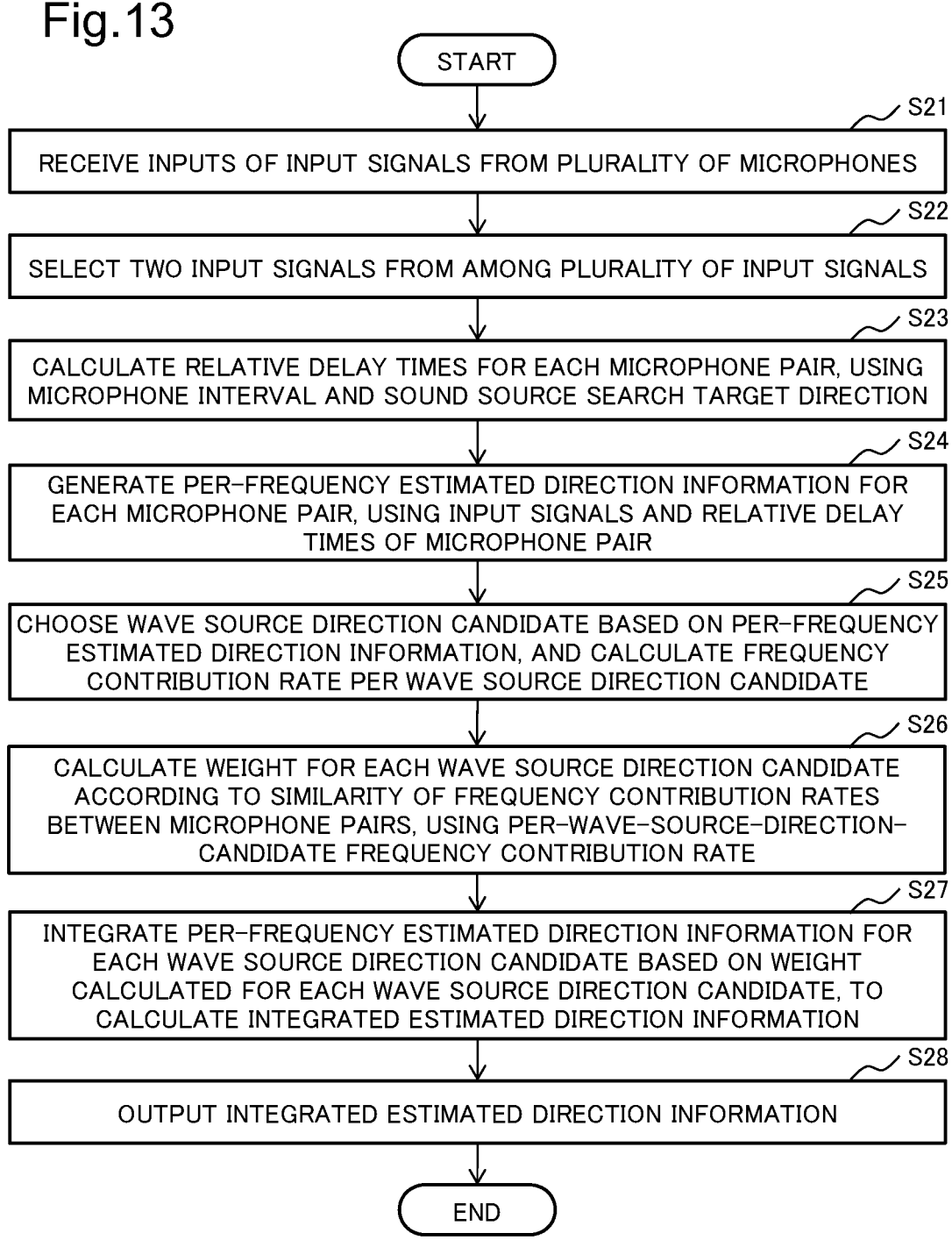
FIG. 13 is a flowchart for explaining an outline of the operation of the wave-source-direction estimation device according to the second example embodiment of the present invention.

Next, an outline of the operation of the wave-source-direction estimation device 20 of the present example embodiment will be described with reference to the drawings. FIG. 13 is a flowchart for explaining an outline of the operation of the wave-source-direction estimation device 20. In the description along the flowchart in FIG. 13, the wave-source-direction estimation device 20 will be described as the subject of the operation.

In FIG. 13, first, the wave-source-direction estimation device 20 acquires input signals from a plurality of microphones (step S21).

Next, the wave-source-direction estimation device 20 selects two input signals from among the input signals relevant to the plurality of microphones in a one-to-one manner (step S22). That is, the wave-source-direction estimation device 20 selects two microphones from among the plurality of microphones to make a microphone pair. Here, the wave-source-direction estimation device 20 selects a plurality of microphone pairs.

Next, the wave-source-direction estimation device 20 calculates the relative delay times for each microphone pair, using an interval (also referred to as microphone interval) between two microphones that are the supply sources of the two selected input signals, and the set sound source search target direction (also referred to as sound source direction) (step S23).

Next, the wave-source-direction estimation device 20 generates the per-frequency estimated direction information on the selected microphone pair, using the input signals and the relative delay times of the selected microphone pair (step S24). That is, the wave-source-direction estimation device 20 generates the per-frequency estimated direction information for each microphone pair.

Next, the wave-source-direction estimation device 20 chooses the wave source direction candidate based on the estimated direction information in which the per-frequency estimated direction information generated for each microphone pair is integrated, and calculates the frequency contribution rate per wave source direction candidate (step S25).

Next, the wave-source-direction estimation device 20 calculates the weight for each wave source direction candidate according to the similarity of the frequency contribution rates between microphone pairs, using the per-wave-source-direction-candidate frequency contribution rate (step S26).

Next, the wave-source-direction estimation device 20 integrates the per-frequency estimated direction information for each wave source direction candidate based on the weight calculated for each wave source direction candidate, to calculate the integrated estimated direction information (step S27).

Then, the wave-source-direction estimation device 20 outputs the integrated estimated direction information (step S28).

The above is the description of an outline of the operation of the wave-source-direction estimation device 20.

As described above, the wave-source-direction estimation device of the present example embodiment includes a plurality of input units, a signal selection unit, a relative delay time calculation unit, a plurality of per-frequency estimated-direction-information generation units, a weight generation unit, and an integration unit.

The input units acquire, as input signals, electrical signals based on waves detected by a plurality of sensors.

The signal selection unit selects a plurality of pairs that are each a combination of two input signals from among a plurality of the input signals.

The relative delay time calculation unit calculates, as relative delay times, arrival time differences of the waves at the sensors that are supply sources of the two input signals composing each of the pairs, for each wave source direction.

The per-frequency estimated-direction-information generation units each acquire two input signals composing one of the pairs from among all pairs selected by the signal selection unit, and also acquire the relative delay times of the acquired pairs. The per-frequency estimated-direction-information generation units each calculate the per-frequency estimated direction information for each of the pairs, using the per-frequency cross-correlation function calculated using the two input signals composing the one of the pairs and the relative delay times of the one of the pairs.

The weight generation unit acquires the per-frequency estimated direction information generated for each of the pairs from the plurality of per-frequency estimated-direction-information generation units. The weight generation unit calculates the wave source direction candidates based on the acquired per-frequency estimated direction information generated for each of the pairs, and calculates the weight for each of the calculated wave source direction candidates.

The integration unit acquires the per-frequency estimated direction information generated for each of the pairs from the plurality of per-frequency estimated-direction-information generation units, and also acquires the weight from the weight generation unit. The integration unit assigns the weight to and integrates a plurality of pieces of the per-frequency estimated direction information generated for each of the pairs to generate the integrated estimated direction information.

For example, the per-frequency estimated-direction-information generation unit includes a conversion unit, a cross-spectrum calculation unit, an average calculation unit, a variance calculation unit, a per-frequency cross-spectrum generation unit, an inverse conversion unit, and a per-frequency estimated-direction-information calculation unit.

The conversion unit converts the two input signals composing one of the pairs into conversion signals in a frequency domain. The cross-spectrum calculation unit calculates a cross spectrum using the conversion signals that have been converted by the conversion unit. The average calculation unit calculates an average cross spectrum using the cross spectrum calculated by the cross-spectrum calculation unit. The variance is calculated using the average cross spectrum calculated by the variance calculation unit and the average calculation unit. The per-frequency cross-spectrum generation unit calculates a per-frequency cross spectrum using the average cross spectrum calculated by the average calculation unit and the variance calculated by the variance calculation unit. The inverse conversion unit inversely converts the frequency cross spectrum calculated by the per-frequency cross-spectrum generation unit to calculate a per-frequency cross-correlation function. The per-frequency estimated-direction-information calculation unit calculates per-frequency estimated direction information that is a correspondence relationship between the wave source direction and a correlation value, based on the per-frequency cross-correlation function and the relative delay times of the one of the pairs.

For example, the weight generation unit includes a plurality of frequency integration units, a plurality of wave-source-direction-candidate choice units, a wave-source-direction-candidate integration unit, a plurality of per-wave-source-direction-candidate frequency contribution rate calculation units, and a weight calculation unit. The frequency integration units each integrate the per-frequency estimated direction information to calculate the estimated direction information for each of the pairs. The wave-source-direction-candidate choice units each detect a peak from the estimated direction information calculated for each of the pairs, and choose a direction with the peak as one of the wave source direction candidates for each of the pairs. The wave-source-direction-candidate integration unit acquires the wave source direction candidates calculated for each of the pairs from the plurality of wave-source-direction-candidate choice units, and integrates the acquired wave source direction candidates calculated for each of the pairs. The per-wave-source-direction-candidate frequency contribution rate calculation units each calculate the contribution rate per frequency with respect to the estimated direction information generated for each of the wave source direction candidate, based on the integrated wave source direction candidates and the per-frequency estimated direction information. The weight calculation unit acquires the contribution rates per frequency with respect to the estimated direction information generated for each of the wave source direction candidates, from the plurality of per-wave-source-direction-candidate frequency contribution rate calculation units. The weight calculation unit calculates the weight for each of the wave source direction candidates, based on the acquired contribution rates per frequency with respect to the estimated direction information generated for each of the wave source direction candidates.

For example, the weight calculation unit calculates the similarity of the frequency contribution rates per wave source direction candidate between the plurality of pairs, and works out the weight for each of the wave source direction candidates based on the calculated similarity.

As described above, the wave-source-direction estimation device of the present example embodiment works out the wave source direction candidates for each microphone pair, and works out the integrated estimated direction information based on the weight calculated for each of the wave source direction candidates. Therefore, in addition to the effect that the direction of the sound source can be highly accurately estimated without erroneous estimation of a virtual-image sound source, the effect that the calculation amount can be reduced is exerted.

Third Example Embodiment

Next, a wave-source-direction estimation device according to a third example embodiment of the present invention will be described with reference to the drawings. The wave-source-direction estimation device of the present example embodiment has a configuration in which the wave source estimation devices of the first and second example embodiments are superficially conceptualized. In the present example embodiment, the wave source is not limited to the sound source, and the direction of the wave source of any wave is put as an estimation target.

Figure 14:
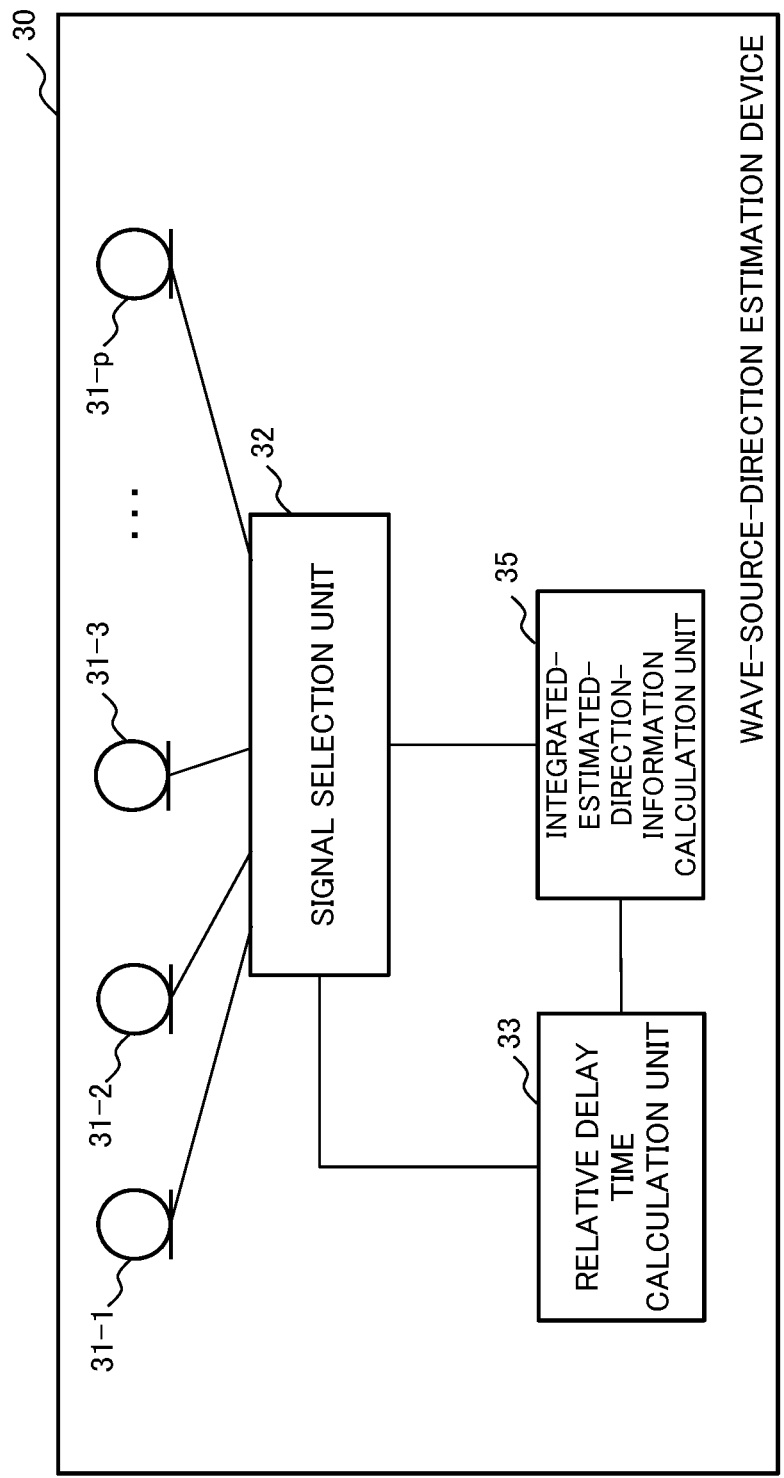
FIG. 14 is a block diagram illustrating an example of the configuration of a wave-source-direction estimation device according to a third example embodiment of the present invention.

FIG. 14 is a block diagram illustrating an example of the configuration of a wave-source-direction estimation device 30 of the present example embodiment. As illustrated in FIG. 14, the wave-source-direction estimation device 30 includes input terminals 31, a signal selection unit 32, a relative delay time calculation unit 33, and an integrated-estimated-direction-information calculation unit 35. In the following, the description of configuration and operation similar to those of the wave-source-direction estimation device 10 of the first example embodiment and the wave-source-direction estimation device 20 of the second example embodiment will be omitted in some cases.

[Input Terminal]

Each of a plurality of the input terminals 31-1 to 31-$p$ (also referred to as input units) is connected to a microphone (not illustrated) (p is an integer equal to or more than 2). Electrical signals that have been converted from waves (also referred to as wave signals) collected by sensors arranged at different positions are input as input signals to each of the plurality of the input terminals 31-1 to 31-$p$. Since the input terminals 31-1 to 31-$p$ have configurations similar to the relevant configurations of the first and second example embodiments, a detailed description thereof will be omitted.

[Signal Selection Unit]

The signal selection unit 32 selects a plurality of sets of two input signals (also referred to as pair of input signals) from among p input signals supplied to the input terminals 31-1 to 31-$p$. The signal selection unit 32 outputs the selected plurality of pairs of input signals to the integrated-estimated-direction-information calculation unit 35, and outputs position information (hereinafter also referred to as sensor position information) on the sensors that are the supply sources of the input signals, to the relative delay time calculation unit 33. Since the signal selection unit 32 has a configuration similar to the relevant configurations of the first and second example embodiments, a detailed description thereof will be omitted.

[Relative Delay Time Calculation Unit]

The sensor position information is input to the relative delay time calculation unit 33 from the signal selection unit 32. The relative delay time calculation unit 33 calculates the relative delay time between the pair of input signals for all the pairs of input signals selected by the signal selection unit 32, using the sensor position information and a sound source search target direction (also referred to as sound source direction). The relative delay time calculation unit 33 outputs the set sound source direction and relative delay time as a set to the integrated-estimated-direction-information calculation unit 35. Since the relative delay time calculation unit 33 has a configuration similar to the relevant configurations of the first and second example embodiments, a detailed description thereof will be omitted.

[Integrated-Estimated-Direction-Information Calculation Unit]

The plurality of pairs of input signals is input to the integrated-estimated-direction-information calculation unit 35 from the signal selection unit 32. The relative delay times of all the pairs of input signals selected by the signal selection unit 32 are input to the integrated-estimated-direction-information calculation unit 35 from the relative delay time calculation unit 33.

The integrated-estimated-direction-information calculation unit 35 generates estimated direction information (also referred to as per-frequency estimated direction information) for each frequency in regard to the plurality of the pairs of the input signals, using the plurality of pairs of input signals and the relative delay times of these pairs of input signals. The integrated-estimated-direction-information calculation unit 35 calculates a frequency contribution rate with respect to the estimated direction information generated for each wave source direction, based on the per-frequency estimated direction information generated for each of the pairs of the input signals. The integrated-estimated-direction-information calculation unit 35 calculates a weight for each wave source direction according to the similarity of the contribution rates between the pairs of input signals, based on the calculated frequency contribution rates. The integrated-estimated-direction-information calculation unit 35 generates integrated estimated direction information by assigning the weight to and integrating the estimated direction information generated for each of the pairs of the input signals. The integrated-estimated-direction-information calculation unit 35 outputs the generated integrated estimated direction information.

In association with the wave-source-direction estimation device 10 of the first example embodiment, the integrated-estimated-direction-information calculation unit 35 has a configuration including the estimated-direction-information and frequency-contribution-rate generation unit 15, the weight calculation unit 16, and the integration unit 17. In association with the wave-source-direction estimation device 20 of the second example embodiment, the integrated-estimated-direction-information calculation unit 35 has a configuration including the per-frequency estimated-direction-information generation unit 25, the weight generation unit 26, and the integration unit 27.

As described above, the wave-source-direction estimation device of the present example embodiment includes a plurality of input units, a signal selection unit, a relative delay time calculation unit, an integrated-estimated-direction-information calculation unit.

The input units acquire, as input signals, electrical signals based on waves detected by a plurality of sensors.

The signal selection unit selects a plurality of pairs that are each a combination of two input signals from among a plurality of the input signals. The relative delay time calculation unit calculates, as relative delay times, arrival time differences of the waves at the sensors that are supply sources of the two input signals composing each of the pairs, for each wave source direction.

The integrated-estimated-direction-information calculation unit generates the per-frequency estimated direction information for each of the pairs, using the input signals composing the one of the pairs and the relative delay times of the one of the pairs. The integrated-estimated-direction-information calculation unit calculates the contribution rate per frequency with respect to the estimated direction information generated for each wave source direction, using the per-frequency estimated direction information generated for each of the pairs. The integrated-estimated-direction-information calculation unit calculates the weight for each wave source direction according to the similarity of the contribution rates between different pairs based on the calculated contribution rates, and generates the integrated estimated direction information by assigning the weight to and integrating the estimated direction information on all the pairs.

For example, the signal selection unit selects a pair that is a combination of at least two input signals, based on an interval between the sensors, from among a plurality of the input signals.

For example, using, as a reference, the wave source searching direction for a pair of the sensors that are supply sources of one pair of the input signals, the relative delay time calculation unit calculates the relative delay times of all pairs of the input signals selected by the signal selection unit, as a function of the wave source searching direction, which is a reference.

According to the wave-source-direction estimation device of the present example embodiment, the direction of the sound source can be highly accurately estimated without erroneous estimation of a virtual-image sound source.

Fourth Example Embodiment

Next, a wave-source-direction estimation device according to a fourth example embodiment of the present invention will be described with reference to the drawings. The wave-source-direction estimation device of the present example embodiment has a configuration in which a wave-source-direction calculation unit is added to the wave-source-direction estimation device of the third example embodiment.

Figure 15:
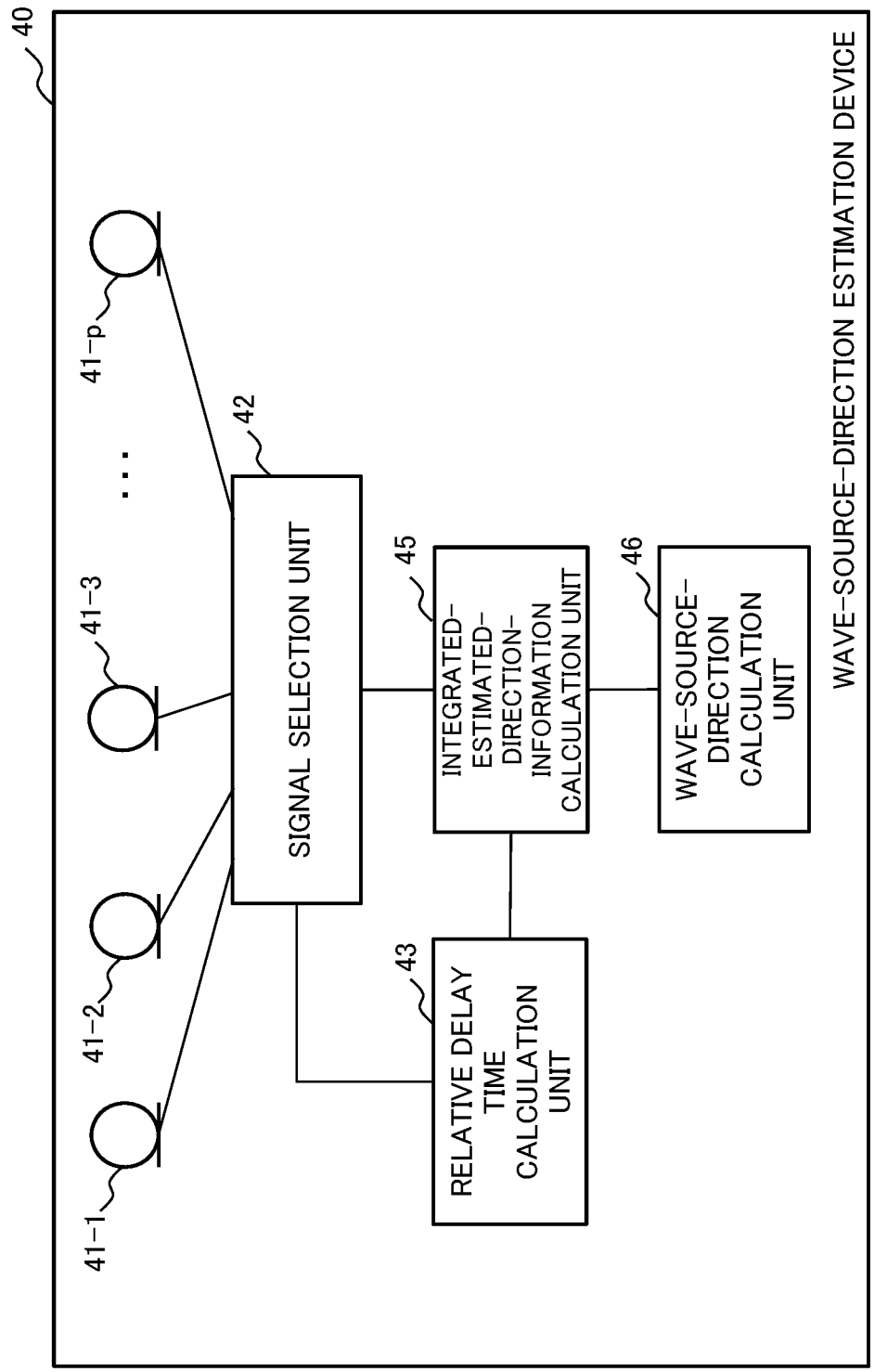
FIG. 15 is a block diagram illustrating an example of the configuration of a wave-source-direction estimation device according to a fourth example embodiment of the present invention.

FIG. 15 is a block diagram representing the configuration of a wave-source-direction estimation device 40 of the present example embodiment. The wave-source-direction estimation device 40 includes input terminals 41, a signal selection unit 42, a relative delay time calculation unit 43, integrated-estimated-direction-information calculation unit 45, and a wave-source-direction calculation unit 46. Since the input terminals 41, the signal selection unit 42, the relative delay time calculation unit 43, and the integrated-estimated-direction-information calculation unit 45 have configurations similar to the relevant configurations of the wave-source-direction estimation device 30 of the third example embodiment, a detailed description thereof will be omitted.

[Wave-Source-Direction Calculation Unit]

The integrated estimated direction information is input to the wave-source-direction calculation unit 46 from the integrated-estimated-direction-information calculation unit 45. The wave-source-direction calculation unit 46 calculates the wave source direction using the integrated estimated direction information. The wave-source-direction calculation unit 46 outputs the calculated wave source direction.

The calculation method for the wave source direction in the wave-source-direction calculation unit 46 will be described in detail below. In the integrated estimated direction information input from the integrated-estimated-direction-information calculation unit 45, the greater the peak, the higher the reliability (the possibility of the presence of a sound source). Therefore, for example, when it can be presumed beforehand that the number of sound sources is one, the wave-source-direction calculation unit 46 outputs a direction in which the integrated estimated direction information is maximum, as the estimated direction. At this time, assuming that the integrated estimated direction information input from the integrated-estimated-direction-information calculation unit 45 is H(θ, n), the wave-source-direction calculation unit 46 can calculate the wave source direction Θ using following formula 46. In formula 45, θ represents all wave source directions or wave source direction candidates.

$$\Theta = \underset{\theta}{\operatorname{argmax}} H(\theta, n) \qquad (46)$$

When the peak of the integrated estimated direction information exceeds a threshold value, the wave-source-direction calculation unit 28 can also regard a direction having the peak exceeding the threshold value as a sound source, and output the direction in which the threshold value is exceeded, as the estimated direction.

The wave-source-direction estimation device of the present example embodiment can also estimate, as the sound source direction, a direction relevant to a time point at which the integrated estimated direction information is maximum, at every fixed time T. However, it is presumed that the direction of the sound source does not change during the fixed time T or that the magnitude of the change is negligibly small. By presuming in this manner, the estimation accuracy for the wave source direction can be improved.

As described above, the wave-source-direction estimation device of the present example embodiment includes a plurality of input units, a signal selection unit, a relative delay time calculation unit, an integrated-estimated-direction-information calculation unit, and a wave-source-direction calculation unit. For example, the wave-source-direction calculation unit calculates, as the wave source direction, a direction relevant to a time point at which the integrated estimated direction information is maximum, at every fixed time. According to the wave-source-direction estimation device of the present example embodiment, the direction of the sound source can be highly accurately estimated without erroneous estimation of a virtual-image sound source.

(Hardware)

Here, the hardware configuration that executes the process of the wave-source-direction estimation device according to each example embodiment will be described with an information processing device 90 in FIG. 16 as an example. The information processing device 90 illustrated in FIG. 16 is an example of a configuration for executing the process of the wave-source-direction estimation device of each example embodiment, and does not limit the scope of the present invention.

Figure 16:
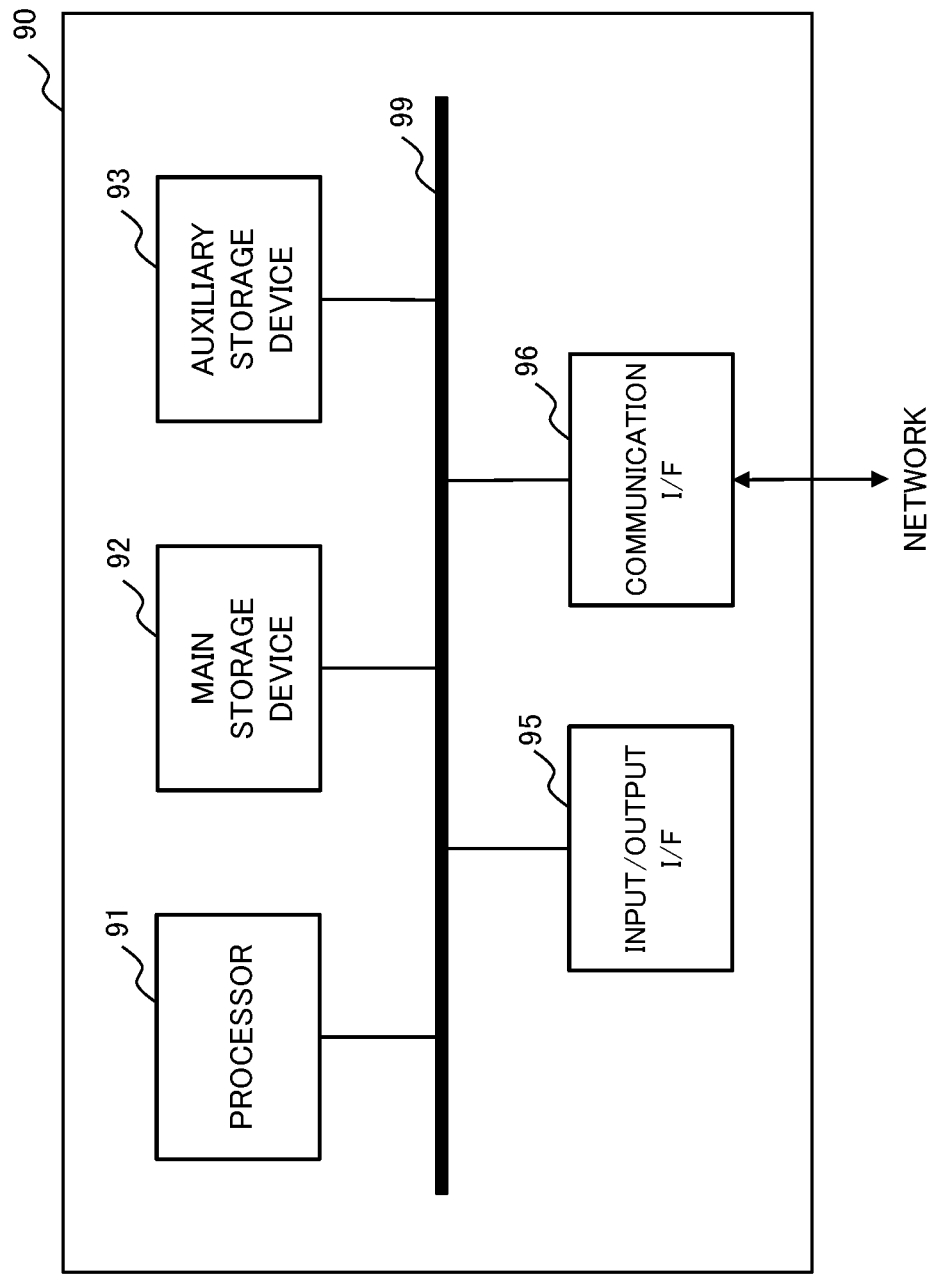
FIG. 16 is a block diagram illustrating an example of a hardware configuration that achieves the wave-source-direction estimation device according to each example embodiment of the present invention.

As illustrated in FIG. 16, the information processing device 90 includes a processor 91, a main storage device 92, an auxiliary storage device 93, an input/output interface 95, and a communication interface 96. In FIG. 16, the interface is denoted as I/F as an abbreviation. The processor 91, the main storage device 92, the auxiliary storage device 93, the input/output interface 95, and the communication interface 96 are connected to each other via a bus 99 so as to enable data communication. The processor 91, the main storage device 92, the auxiliary storage device 93, and the input/output interface 95 are connected to a network such as the Internet or an intranet via the communication interface 96.

The processor 91 expands programs stored in the auxiliary storage device 93 and the like into the main storage device 92, and executes the expanded programs. The present example embodiment can employ a configuration using a software program installed in the information processing device 90. The processor 91 executes processes by the wave-source-direction estimation devices according to the present example embodiments.

The main storage device 92 has an area in which a program is expanded. The main storage device 92 can be, for example, a volatile memory such as a dynamic random access memory (DRAM). A nonvolatile memory such as a magnetoresistive random access memory (MRAM) may be configured and added as the main storage device 92.

The auxiliary storage device 93 stores diverse kinds of data. The auxiliary storage device 93 is constituted by a local disk such as a hard disk or a flash memory. A configuration for storing diverse kinds of data in the main storage device 92 can be employed such that the auxiliary storage device 93 is omitted.

The input/output interface 95 is an interface for connecting the information processing device 90 and peripheral equipment. The communication interface 96 is an interface for connecting to an external system or device through a network such as the Internet or an intranet in accordance with a standard or specifications. The input/output interface 95 and the communication interface 96 may be commonly used as an interface for connecting to external equipment.

The information processing device 90 may be configured such that input equipment such as a keyboard, a mouse, or a touch panel is connected to the information processing device 90 as required. These pieces of input equipment are used to input information and settings. When the touch panel is used as input equipment, a configuration for utilizing the display screen of display equipment also as an interface of the input equipment can be employed. Data communication between the processor 91 and the input equipment can be mediated by the input/output interface 95.

The information processing device 90 may be provided with display equipment for displaying information. When display equipment is provided, the information processing device 90 preferably includes a display control device (not illustrated) for controlling the display on the display equipment. The display equipment can be connected to the information processing device 90 via the input/output interface 95.

The information processing device 90 may be provided with a disk drive as required. The disk drive is connected to the bus 99. The disk drive mediates between the processor 91 and a storage medium (program storage medium) (not illustrated), such as reading data and program from the storage medium and writing the processing result of the information processing device 90 to the storage medium. The storage medium can be achieved by, for example, an optical storage medium such as a compact disc (CD) or a digital versatile disc (DVD). The storage medium may be achieved by a semiconductor storage medium such as a universal serial bus (USB) memory or a secure digital (SD) card, a magnetic storage medium such as a flexible disk, or another storage medium.

The above is an example of a hardware configuration for enabling the wave-source-direction estimation device according to each example embodiment. The hardware configuration in FIG. 16 is an example of a hardware configuration for executing the arithmetic process of the wave-source-direction estimation device according to each example embodiment, and does not limit the scope of the present invention. A program for causing a computer to execute a process relating to the wave-source-direction estimation device according to each example embodiment is also included in the scope of the present invention. Furthermore, a program storage medium on which a program according to each example embodiment is stored is also included in the scope of the present invention.

The constituent elements of the wave-source-direction estimation device of each example embodiment can be freely combined. The constituent elements of the wave-source-direction estimation device of each example embodiment may be achieved by software or by a circuit.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention as defined by the claims.

Some or all of the above example embodiments can also be described as in the following supplementary notes, but are not limited to the following.

(Supplementary Note 1)

A wave-source-direction estimation device including:

a plurality of input means for acquiring, as input signals, electrical signals based on waves detected by a plurality of sensors;

a signal selection means for selecting a plurality of pairs that are each a combination of two input signals from among a plurality of the input signals;

a relative delay time calculation means for calculating, as relative delay times, arrival time differences of the waves at the sensors that are supply sources of the two input signals composing each of the pairs, for each wave source direction; and an integrated-estimated-direction-information calculation means for generating per-frequency estimated direction information for each of the pairs using the input signals composing each of the pairs and the relative delay times of each of the pairs, calculating contribution rates per frequency with respect to estimated direction information generated for each wave source direction using the per-frequency estimated direction information generated for each of the pairs, calculating, based on the calculated contribution rates, a weight for each wave source direction according to a similarity of the contribution rates between different pairs among the pairs, and generating integrated estimated direction information by assigning the weight to and integrating the estimated direction information on all the pairs.

(Supplementary Note 2)

The wave-source-direction estimation device according to supplementary note 1, in which the signal selection means selects the pairs that are each a combination of two input signals, based on an interval between the sensors, from among the plurality of the input signals.

(Supplementary Note 3)

The wave-source-direction estimation device according to supplementary note 1 or 2, in which, using, as a reference, a wave source searching direction at sensors among the sensors that are supply sources of the two input signals composing one of the pairs, the relative delay time calculation means calculates the relative delay times of all the pairs selected by the signal selection means, as a function of the wave source searching direction, which is a reference.

(Supplementary Note 4)

The wave-source-direction estimation device according to any one of supplementary notes 1 to 3, in which the integrated-estimated-direction-information calculation means includes:

a plurality of estimated-direction-information and frequency-contribution-rate generation means for acquiring two input signals composing one of the pairs among all the pairs selected by the signal selection means, also acquiring the relative delay times of the acquired pair, and generating the estimated direction information between the two input signals composing the one of the pairs and the contribution rates per frequency using a per-frequency cross-correlation function between the two input signals composing the one of the pairs and the relative delay times of the one of the pairs;

a weight calculation means for acquiring the contribution rates calculated for each frequency from the plurality of the estimated-direction-information and frequency-contribution-rate generation means, and calculating the weight for each wave source direction according to the similarity of the contribution rates between different pairs among the pairs; and an integration means for acquiring the estimated direction information from the plurality of the estimated-direction-information and frequency-contribution-rate generation means, also acquiring the weight from the weight calculation means, and generating the integrated estimated direction information by assigning the weight to and integrating a plurality of pieces of the estimated direction information generated for each of the pairs.

(Supplementary Note 5)

The wave-source-direction estimation device according to supplementary note 4, in which the estimated-direction-information and frequency-contribution-rate generation means each include:

a conversion means for converting the two input signals composing one of the pairs into conversion signals in a frequency domain;

a cross-spectrum calculation means for calculating a cross spectrum using the conversion signals that have been converted by the conversion means;

an average calculation means for calculating an average cross spectrum using the cross spectrum calculated by the cross-spectrum calculation means;

a variance calculation means for calculating variance using the average cross spectrum calculated by the average calculation means;

a per-frequency cross-spectrum generation means for calculating a per-frequency cross spectrum using the average cross spectrum calculated by the average calculation means and the variance calculated by the variance calculation means;

an inverse conversion means for inversely converting the per-frequency cross spectrum calculated by the per-frequency cross-spectrum generation means to calculate a per-frequency cross-correlation function;

a per-frequency estimated-direction-information calculation means for calculating per-frequency estimated direction information that is a correspondence relationship between the wave source direction and a correlation value, based on the per-frequency cross-correlation function and the relative delay times of the one of the pairs;

a frequency integration means for integrating the per-frequency estimated direction information to calculate the estimated direction information; and a frequency contribution rate calculation means for calculating the contribution rates per frequency with respect to the estimated direction information for each wave source direction, based on the per-frequency estimated direction information.

(Supplementary Note 6)

The wave-source-direction estimation device according to supplementary note 4 or 5, in which the weight calculation means calculates the similarity of the contribution rates between the plurality of the pairs, and calculates the weight for each wave source direction based on the calculated similarity.

(Supplementary Note 7)

The wave-source-direction estimation device according to any one of supplementary notes 1 to 3, in which the integrated-estimated-direction-information calculation means includes:

a plurality of per-frequency estimated-direction-information generation means for acquiring two input signals composing one of the pairs among all the pairs selected by the signal selection means, also acquiring the relative delay times of the acquired pair, and calculating per-frequency estimated direction information for each of the pairs using a per-frequency cross-correlation function calculated using the two input signals composing the one of the pairs and the relative delay times of the one of the pairs;

a weight generation means for acquiring the per-frequency estimated direction information generated for each of the pairs from the plurality of the per-frequency estimated-direction-information generation means, calculating wave source direction candidates based on the acquired per-frequency estimated direction information generated for each of the pairs, and calculating the weight for each of the calculated wave source direction candidates; and an integration means for acquiring the per-frequency estimated direction information generated for each of the pairs from the plurality of the per-frequency estimated-direction-information generation means, also acquiring the weight from the weight generation means, and generating the integrated estimated direction information by assigning the weight to and integrating a plurality of pieces of the per-frequency estimated direction information generated for each of the pairs.

(Supplementary Note 8)

The wave-source-direction estimation device according to supplementary note 7, in which the per-frequency estimated-direction-information generation means each include:

a conversion means for converting the two input signals composing one of the pairs into conversion signals in a frequency domain;

a cross-spectrum calculation means for calculating a cross spectrum using the conversion signals that have been converted by the conversion means;

an average calculation means for calculating an average cross spectrum using the cross spectrum calculated by the cross-spectrum calculation means;

a variance calculation means for calculating variance using the average cross spectrum calculated by the average calculation means;

a per-frequency cross-spectrum generation means for calculating a per-frequency cross spectrum using the average cross spectrum calculated by the average calculation means and the variance calculated by the variance calculation means;

an inverse conversion means for inversely converting the per-frequency cross spectrum calculated by the per-frequency cross-spectrum generation means to calculate a per-frequency cross-correlation function; and a per-frequency estimated-direction-information calculation means for calculating per-frequency estimated direction information that is a correspondence relationship between the wave source direction and a correlation value, based on the per-frequency cross-correlation function and the relative delay times of the one of the pairs.

(Supplementary Note 9)

The wave-source-direction estimation device according to supplementary note 8, in which the weight generation means includes:

a plurality of frequency integration means for integrating the per-frequency estimated direction information to calculate the estimated direction information for each of the pairs;

a plurality of wave-source-direction-candidate choice means for detecting a peak from the estimated direction information generated for each of the pairs and choosing a direction with the peak as one of the wave source direction candidates for each of the pairs;

a wave-source-direction-candidate integration means for acquiring the wave source direction candidates calculated for each of the pairs from the plurality of the wave-source-direction-candidate choice means, and integrating the acquired wave source direction candidates calculated for each of the pairs;

a plurality of per-wave-source-direction-candidate frequency contribution rate calculation means for calculating the contribution rates per frequency with respect to the estimated direction information generated for each of the wave source direction candidates, based on the integrated wave source direction candidates and the per-frequency estimated direction information; and a weight calculation means for acquiring the contribution rates per frequency with respect to the estimated direction information generated for each of the wave source direction candidates from the plurality of the per-wave-source-direction-candidate frequency contribution rate calculation means, and calculating the weight for each of the wave source direction candidates, based on the acquired contribution rates per frequency with respect to the estimated direction information generated for each of the wave source direction candidates.

(Supplementary Note 10)

The wave-source-direction estimation device according to supplementary note 9, in which the weight calculation means
calculates the similarity of the contribution rates per frequency calculated for each of the wave source direction candidates, between the plurality of the pairs, and works out the weight for each of the wave source direction candidates based on the calculated similarity.

(Supplementary Note 11)

The wave-source-direction estimation device according to any one of supplementary notes 1 to 10, further including a wave-source-direction calculation means for calculating a wave source direction based on the integrated estimated direction information calculated by the integrated-estimated-direction-information calculation means.

(Supplementary Note 12)

The wave-source-direction estimation device according to supplementary note 11, in which the wave-source-direction calculation means
calculates, as the wave source direction, a direction relevant to a time point at which the integrated estimated direction information is maximum, at every fixed time.

(Supplementary Note 13)

The wave-source-direction estimation device according to any one of supplementary notes 1 to 12, including the sensors that are arranged in one-to-one association with the plurality of the input means.

(Supplementary Note 14)

A wave-source-direction estimation method implemented by an information processing device, the wave-source-direction estimation method including:

acquiring, as input signals, electrical signals based on waves detected by a plurality of sensors;

selecting a plurality of pairs that are each a combination of two input signals from among a plurality of the input signals;

calculating, as relative delay times, arrival time differences of the waves at the sensors that are supply sources of the two input signals composing each of the pairs, for each wave source direction;

generating per-frequency estimated direction information for each of the pairs using the input signals composing each of the pairs and the relative delay times of each of the pairs;

calculating contribution rates per frequency with respect to estimated direction information generated for each wave source direction using the per-frequency estimated direction information generated for each of the pairs;

calculating, based on the calculated contribution rates, a weight for each wave source direction according to a similarity of the contribution rates between different pairs among the pairs; and generating integrated estimated direction information by assigning the weight to and integrating the estimated direction information on all the pairs.

(Supplementary Note 15)

A program storage medium having stored therein a program for causing a computer to execute:

a process of acquiring, as input signals, electrical signals based on waves detected by a plurality of sensors;

a process of selecting a plurality of pairs that are each a combination of two input signals from among a plurality of the input signals;

a process of calculating, as relative delay times, arrival time differences of the waves at the sensors that are supply sources of the two input signals composing each of the pairs, for each wave source direction;

a process of generating per-frequency estimated direction information for each of the pairs using the input signals composing each of the pairs and the relative delay times of each of the pairs;

a process of calculating contribution rates per frequency with respect to estimated direction information generated for each wave source direction using the per-frequency estimated direction information generated for each of the pairs;

a process of calculating, based on the calculated contribution rates, a weight for each wave source direction according to a similarity of the contribution rates between different pairs among the pairs; and a process of generating integrated estimated direction information by assigning the weight to and integrating the estimated direction information on all the pairs.

REFERENCE SIGNS LIST 10 wave-source-direction estimation device
11 input terminal
12 signal selection unit
13 relative delay time calculation unit 15 estimated-direction-information and frequency-contribution-rate generation unit
16 weight calculation unit
17 integration unit
20 wave-source-direction estimation device
21 input terminal
22 signal selection unit
23 relative delay time calculation unit
25 per-frequency estimated-direction-information generation unit
26 weight generation unit
27 integration unit
30 wave-source-direction estimation device
31 input terminal
32 signal selection unit
33 relative delay time calculation unit
35 integrated-estimated-direction-information calculation unit
41 input terminal
42 signal selection unit
43 relative delay time calculation unit
45 integrated-estimated-direction-information calculation unit
46 wave-source-direction calculation unit
151 conversion unit
152 cross-spectrum calculation unit
153 average calculation unit
154 variance calculation unit
155 per-frequency cross-spectrum generation unit
156 inverse conversion unit
157 per-frequency estimated-direction-information calculation unit
158 frequency contribution rate calculation unit
159 frequency integration unit
251 conversion unit
252 cross-spectrum calculation unit
253 average calculation unit
254 variance calculation unit
255 per-frequency cross-spectrum generation unit
256 inverse conversion unit
257 per-frequency estimated-direction-information calculation unit
261 frequency integration unit
262 wave-source-direction-candidate choice unit
263 wave-source-direction-candidate integration unit
264 per-wave-source-direction-candidate frequency contribution rate calculation unit
265 weight calculation unit
551 per-frequency basic-cross-spectrum calculation unit
552 kernel-function-spectrum generation unit
553 multiplication unit

What is claimed is:

1. A wave-source-direction estimation device comprising:
at least one memory storing instructions; and
at least one processor connected to the at least one memory and configured to execute the instructions to:
acquire, as input signals, electrical signals based on waves detected by a plurality of sensors;
select a plurality of pairs that are each a combination of two input signals from among a plurality of the input signals;
calculate, as relative delay times, arrival time differences of the waves at the sensors that are supply sources of the two input signals composing each of the pairs, for each wave source direction; and
generate per-frequency estimated direction information for each of the pairs using the input signals composing each of the pairs and the relative delay times of each of the pairs,
calculate contribution rates per frequency with respect to estimated direction information generated for each wave source direction using the per-frequency estimated direction information generated for each of the pairs,
calculate, based on the calculated contribution rates, a weight for each wave source direction according to a similarity of the contribution rates between different pairs among the pairs, and
generate integrated estimated direction information by assigning the weight to and integrating the estimated direction information on all the pairs.

2. The wave-source-direction estimation device according to claim 1, wherein the at least one processor is configured to execute the instructions to
select the pairs that are each a combination of two input signals, based on an interval between the sensors, from among the plurality of the input signals.

3. The wave-source-direction estimation device according to claim 1, wherein, using, as a reference, a wave source searching direction at sensors among the sensors that are supply sources of the two input signals composing one of the pairs, the at least one processor is configured to execute the instructions to
calculate the relative delay times of all the selected pairs, as a function of the wave source searching direction, which is a reference.

4. The wave-source-direction estimation device according to claim 1, wherein the at least one processor is configured to execute the instructions to:
acquire two input signals composing one of the pairs among all the selected pairs;
generate the estimated direction information between the two input signals composing the one of the pairs and the contribution rates per frequency using a per-frequency cross-correlation function between the two input signals composing the one of the pairs and the relative delay times of the one of the pairs;
calculate the weight for each wave source direction according to the similarity of the contribution rates between different pairs among the pairs; and
generate the integrated estimated direction information by assigning the weight to and integrating a plurality of pieces of the estimated direction information generated for each of the pairs.

5. The wave-source-direction estimation device according to claim 4, wherein the at least one processor is configured to execute the instructions to:
convert the two input signals composing one of the pairs into conversion signals in a frequency domain;
calculate a cross spectrum using the conversion signals;
calculate an average cross spectrum using the cross spectrum;
calculate variance using the average cross spectrum;
calculate a per-frequency cross spectrum using the average cross spectrum and the variance;
inversely convert the per-frequency cross spectrum to calculate a per-frequency cross-correlation function;
calculate per-frequency estimated direction information that is a correspondence relationship between the wave source direction and a correlation value, based on the per-frequency cross-correlation function and the relative delay times of the one of the pairs;

integrate the per-frequency estimated direction information to calculate the estimated direction information; and calculate the contribution rates per frequency with respect to the estimated direction information for each wave source direction, based on the per-frequency estimated direction information.

6. The wave-source-direction estimation device according to claim 1, wherein the at least one processor is configured to execute the instructions to calculate the similarity of the contribution rates between the plurality of the pairs, and calculate the weight for each wave source direction based on the calculated similarity.

7. The wave-source-direction estimation device according to claim 1, wherein the at least one processor is configured to execute the instructions to:

acquire two input signals composing one of the pairs among all the selected pairs;

calculate per-frequency estimated direction information for each of the pairs using a per-frequency cross-correlation function calculated using the two input signals composing the one of the pairs and the relative delay times of the one of the pairs;

calculate wave source direction candidates based on the acquired per-frequency estimated direction information generated for each of the pairs;

calculate the weight for each of the calculated wave source direction candidates; and generate the integrated estimated direction information by assigning the weight to and integrating a plurality of pieces of the per-frequency estimated direction information generated for each of the pairs.

8. The wave-source-direction estimation device according to claim 7, wherein the at least one processor is configured to execute the instructions to:

convert the two input signals composing one of the pairs into conversion signals in a frequency domain;

calculate a cross spectrum using the conversion signals;

calculate an average cross spectrum using the cross spectrum;

calculate variance using the average cross spectrum;

calculate a per-frequency cross spectrum using the average cross spectrum and the variance;

inversely convert the per-frequency cross spectrum to calculate a per-frequency cross-correlation function; and calculate per-frequency estimated direction information that is a correspondence relationship between the wave source direction and a correlation value, based on the per-frequency cross-correlation function and the relative delay times of the one of the pairs.

9. The wave-source-direction estimation device according to claim 8, wherein the at least one processor is configured to execute the instructions to:

integrate the per-frequency estimated direction information to calculate the estimated direction information for each of the pairs;

detect a peak from the estimated direction information generated for each of the pairs and choose a direction with the peak as one of the wave source direction candidates for each of the pairs;

integrate the wave source direction candidates calculated for each of the pairs;

calculate the contribution rates per frequency with respect to the estimated direction information generated for each of the wave source direction candidates, based on the integrated wave source direction candidates and the per-frequency estimated direction information; and calculate the weight for each of the wave source direction candidates, based on the acquired contribution rates per frequency with respect to the estimated direction information generated for each of the wave source direction candidates.

10. The wave-source-direction estimation device according to claim 9, wherein the at least one processor is configured to execute the instructions to calculate the similarity of the contribution rates per frequency calculated for each of the wave source direction candidates, between the plurality of the pairs; and work out the weight for each of the wave source direction candidates based on the calculated similarity.

11. The wave-source-direction estimation device according to claim 1, wherein the at least one processor is configured to execute the instructions to calculate a wave source direction based on the integrated estimated direction information.

12. The wave-source-direction estimation device according to claim 11, wherein the at least one processor is configured to execute the instructions to calculate, as the wave source direction, a direction relevant to a time point at which the integrated estimated direction information is maximum, at every fixed time.

13. The wave-source-direction estimation device according to claim 1, comprising the sensors that are arranged in one-to-one association with a plurality of inputs.

14. A wave-source-direction estimation method implemented by an information processing device, the wave-source-direction estimation method comprising:

acquiring, as input signals, electrical signals based on waves detected by a plurality of sensors;

selecting a plurality of pairs that are each a combination of two input signals from among a plurality of the input signals;

calculating, as relative delay times, arrival time differences of the waves at the sensors that are supply sources of the two input signals composing each of the pairs, for each wave source direction;

generating per-frequency estimated direction information for each of the pairs using the input signals composing each of the pairs and the relative delay times of each of the pairs;

calculating contribution rates per frequency with respect to estimated direction information generated for each wave source direction using the per-frequency estimated direction information generated for each of the pairs;

calculating, based on the calculated contribution rates, a weight for each wave source direction according to a similarity of the contribution rates between different pairs among the pairs; and generating integrated estimated direction information by assigning the weight to and integrating the estimated direction information on all the pairs.

15. A non-transitory program storage medium having stored therein a program for causing a computer to execute:

a process of acquiring, as input signals, electrical signals based on waves detected by a plurality of sensors;

a process of selecting a plurality of pairs that are each a combination of two input signals from among a plurality of the input signals;

a process of calculating, as relative delay times, arrival time differences of the waves at the sensors that are supply sources of the two input signals composing each of the pairs, for each wave source direction;

a process of generating per-frequency estimated direction information for each of the pairs using the input signals composing each of the pairs and the relative delay times of each of the pairs;

a process of calculating contribution rates per frequency with respect to estimated direction information generated for each wave source direction using the per-frequency estimated direction information generated for each of the pairs;

a process of calculating, based on the calculated contribution rates, a weight for each wave source direction according to a similarity of the contribution rates between different pairs among the pairs; and a process of generating integrated estimated direction information by assigning the weight to and integrating the estimated direction information on all the pairs.

* * * * *